(12) United States Patent
Hirata et al.

(10) Patent No.: US 8,605,387 B2
(45) Date of Patent: Dec. 10, 2013

(54) THERMALLY-ASSISTED MAGNETIC RECORDING HEAD INCLUDING A MAGNETIC POLE AND A HEATING ELEMENT

(75) Inventors: Kei Hirata, Tokyo (JP); Kosuke Tanaka, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 47 days.

(21) Appl. No.: 13/412,109

(22) Filed: Mar. 5, 2012

(65) Prior Publication Data

US 2013/0229730 A1 Sep. 5, 2013

(51) Int. Cl.
*G11B 5/127* (2006.01)

(52) U.S. Cl.
USPC .............. 360/125.31; 360/125.3; 360/125.32; 360/125.74; 360/125.75

(58) Field of Classification Search
USPC ............... 360/125.04, 125.08, 125.3, 125.31, 360/125.32, 125.74, 125.75; 369/13.33
See application file for complete search history.

(56) References Cited

U.S. PATENT DOCUMENTS

| 6,952,325 | B2 * | 10/2005 | Sato et al. ................ 360/125.08 |
| 7,652,954 | B2 * | 1/2010 | Fontana et al. ............ 369/13.13 |
| 7,692,895 | B1 * | 4/2010 | Wu et al. .................. 360/125.08 |
| 2011/0058272 | A1 | 3/2011 | Miyauchi et al. | |
| 2011/0096638 | A1 * | 4/2011 | Mochizuki et al. ........ 369/13.33 |

FOREIGN PATENT DOCUMENTS

JP      A-2008-10093      1/2008

* cited by examiner

*Primary Examiner* — Hoa T Nguyen
*Assistant Examiner* — Carlos E Garcia
(74) *Attorney, Agent, or Firm* — Oliff & Berridge, PLC

(57) ABSTRACT

A thermally-assisted magnetic recording head includes a magnetic pole and a heating element. The magnetic pole has a front end face located in a medium facing surface. The magnetic pole forms on a track a distribution of write magnetic field strength that peaks at a first position on the track. The heating element forms on the track a distribution of temperature that peaks at a second position on the track. The first position is located on the trailing side relative to the second position. The front end face of the magnetic pole has a main portion and first and second extended portions. The first and second extended portions are extended in the track width direction from the main portion at positions on the leading side relative to the center of the main portion in the direction of travel of a magnetic recording medium.

8 Claims, 25 Drawing Sheets

THERMALLY-ASSISTED MAGNETIC RECORDING HEAD INCLUDING A MAGNETIC POLE AND A HEATING ELEMENT

BACKGROUND OF THE INVENTION

1. Field of the Invention

The present invention relates to a thermally-assisted magnetic recording head including a magnetic pole and a heating element, and to a method of manufacturing the same.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium. The slider has a medium facing surface that faces the magnetic recording medium. The medium facing surface has an air inflow end (a leading end) and an air outflow end (a trailing end).

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

The thermally-assisted magnetic recording head includes a magnetic pole for applying a write magnetic field to the magnetic recording medium, and a heating element for applying heat to the magnetic recording medium. Near-field light is typically used as a means for applying heat to the magnetic recording medium. A plasmon generator, which is a piece of metal that generates near-field light from plasmons excited by irradiation with light, is typically used as the heating element. Thermally-assisted magnetic recording heads including such a plasmon generator are disclosed in, for example, U.S. Patent Application Publication Nos. 2011/0058272 A1 and 2011/0096638 A1, and JP-A-2008-10093.

For conventional recording methods using only magnetism, the main factor contributing to the enhancement of linear recording density is a steep gradient of the change in write magnetic field strength in the direction along the tracks or the direction in which the tracks extend. In addition to this, for thermally-assisted magnetic recording, a change in temperature occurring in the magnetic recording medium in the direction along the tracks due to the heat applied to the magnetic recording medium and a change in coercivity occurring in the magnetic recording medium in the direction along the tracks due to the aforementioned temperature change also contribute to the enhancement of linear recording density. This will now be described in detail.

To achieve the enhancement of linear recording density, it is effective to enhance the abruptness of magnetization transition in the magnetic recording medium. For thermally-assisted magnetic recording, the abruptness of magnetization transition in the magnetic recording medium can be expressed by the effective magnetic field gradient $dHeff/dx$ which is defined by Equation (1) below. The greater $dHeff/dx$, the higher the abruptness of magnetization transition becomes.

$$dHeff/dx = (-dHc/dT) \cdot (dT/dx) + dHh/dx \quad (1)$$

In the equation above, $-dHc/dT$ represents the gradient of the change in coercivity of the magnetic recording medium with respect to the change in temperature of the magnetic recording medium. The term "$-dHc/dT$" takes on a positive value. The term "$dT/dx$" represents the gradient of the change in temperature of the magnetic recording medium with respect to the change in position in the direction along the tracks of the magnetic recording medium. The term "$dHh/dx$" represents the gradient of the change in write magnetic field strength at each position with respect to the change in position in the direction along the tracks of the magnetic recording medium. Hereinafter, $dT/dx$ will be referred to as the gradient of temperature with respect to position, while $dHh/dx$ will be referred to as the gradient of write magnetic field strength with respect to position.

For the conventional recording methods using only magnetism, the main factor contributing to the enhancement of linear recording density is $dHh/dx$ in Equation (1). In addition to $dHh/dx$, for thermally-assisted magnetic recording, the term "$(-dHc/dT) \cdot (dT/dx)$" also contributes to the enhancement of linear recording density, i.e., the enhancement of the abruptness of magnetization transition, as can be seen from Equation (1).

In thermally-assisted magnetic recording, on a track of the magnetic recording medium there occur a distribution of the write magnetic field strength that peaks at a given first position and a distribution of the temperature of the magnetic recording medium that peaks at a given second position. Hereinafter, the first position will be referred to as the peak write magnetic field point, and the second position will be referred to as the peak heat point. The peak write magnetic field point and the peak heat point are preferably located close to each other. However, since it is not possible to place the magnetic pole and the plasmon generator at the same position, the peak write magnetic field point and the peak heat point are located at positions different from each other. Therefore, the distribution of the write magnetic field strength and the distribution of the temperature partially overlap each other. The distribution of the temperature causes a distribution of the coercivity of the magnetic recording medium to occur on the track.

Here, the side of positions closer to the leading end relative to a reference position will be defined as the leading side, and the side of positions closer to the trailing end relative to the reference position will be defined as the trailing side. The leading side is the rear side in the direction of travel of the magnetic recording medium relative to the slider. The trailing side is the front side in the direction of travel of the magnetic recording medium relative to the slider.

For thermally-assisted magnetic recording, the position on the track at which a magnetization transition takes place is determined as follows. On the track, on the trailing side relative to the peak heat point, the temperature decreases and accordingly the coercivity increases as the distance from the peak heat point increases. The direction of magnetization is not determined when the coercivity is lower than the write magnetic field strength, but is determined when the coercivity is equal to or higher than the write magnetic field strength. Accordingly, on the trailing side relative to the peak heat point, the position of the point of intersection of the distribution curve of the coercivity and the distribution curve of the write magnetic field strength determines the position at which a magnetization transition takes place. Hereinafter, this point of intersection will be referred to as the write point.

Thermally-assisted magnetic recording heads can be configured such that the peak write magnetic field point is located on the leading side relative to the peak heat point, or such that the peak write magnetic field point is located on the trailing side relative to the peak heat point. It has been found that the latter configuration can raise the following problem depending on the positions of the write point and the peak write magnetic field point relative to each other.

In the configuration in which the peak write magnetic field point is located on the trailing side relative to the peak heat point, the write point is also located on the trailing side relative to the peak heat point. In this case, the write point and the peak write magnetic field point can conceivably be in the following first or second positional relationship with each other. The first positional relationship is such that the peak write magnetic field point is located at the same position as the write point or on the leading side relative to the write point. The second positional relationship is such that the peak write magnetic field point is located on the trailing side relative to the write point.

When the write point and the peak write magnetic field point are in the first positional relationship, in a given region on the trailing side relative to the write point, the coercivity increases whereas the write magnetic field strength decreases as the distance from the write point increases, so that the difference between the coercivity and the write magnetic field strength increases with increasing distance from the write point. In this case, no magnetization reversal will occur on the trailing side relative to the write point. When the peak write magnetic field point is located on the leading side relative to the write point, in particular, at the write point both the gradient of temperature with respect to position dT/dx and the gradient of write magnetic field strength with respect to position dHh/dx in Equation (1) take on a negative value to increase the absolute value of the effective magnetic field gradient dHeff/dx, thereby allowing the enhancement of linear recording density.

On the other hand, when the write point and the peak write magnetic field point are in the second positional relationship, in the region from the write point to the peak write magnetic field point located on the trailing side relative thereto, the coercivity increases and the write magnetic field strength also increases as the distance from the write point increases. Thus, in the aforementioned region, the difference between the coercivity and the write magnetic field strength is small and therefore there is a possibility that magnetization reversal can occur due to variations in coercivity or other factors. This may lead to the problems that the magnetization transition width increases to decrease the linear recording density, and erasure of data or erroneous writing may occur on the trailing side relative to the write point.

Thus, in the configuration in which the peak write magnetic field point is located on the trailing side relative to the peak heat point, it is preferable that the write point and the peak write magnetic field point be in the first positional relationship mentioned above. If there is a large distance between the peak write magnetic field point and the peak heat point, however, the write point and the peak write magnetic field point tend to be in the second positional relationship mentioned above.

On the other hand, the enhancement of linear recording density is achievable by steepening the distribution of temperature so as to increase the absolute value of the gradient of temperature with respect to position dT/dx on the trailing side relative to the peak heat point and thereby increase the absolute value of the effective magnetic field gradient dHeff/dx. However, increasing the absolute value of the gradient of temperature with respect to position dT/dx on the trailing side relative to the peak heat point would cause the write point to be closer to the peak heat point. As a result, the write point and the peak write magnetic field point tend to be in the second positional relationship mentioned above.

In the configuration in which the peak write magnetic field point is located on the trailing side relative to the peak heat point, the first positional relationship, which is preferable, can be readily achieved by reducing the distance between the peak write magnetic field point, and the peak heat point. The distance between the peak write magnetic field point and the peak heat point can be reduced by bringing the magnetic pole and the plasmon generator closer to each other. However, restrictions on the arrangement of the magnetic pole and the plasmon generator should impose limitations on this method for reducing the distance between the peak write magnetic field point and the peak heat point.

OBJECT AND SUMMARY OF THE INVENTION

It is an object of the present invention to provide a thermally-assisted magnetic recording head and a method of manufacturing the same, the thermally-assisted magnetic recording head being configured so that the peak write magnetic field point is located on the trailing side relative to the peak heat point and being capable of reducing the distance between the peak write magnetic field point and the peak heat point, and to provide a head gimbal assembly and a magnetic recording device that each include the thermally-assisted magnetic recording head.

A thermally-assisted magnetic recording head of the present invention includes: a medium facing surface that faces a magnetic recording medium having a track; a magnetic pole that has a front end face located in the medium facing surface and produces a write magnetic field for writing data on the magnetic recording medium; and a heating element that applies heat to the magnetic recording medium.

The magnetic pole forms on the track a distribution of write magnetic field strength that peaks at a first position on the track. The heating element forms on the track a distribution of temperature that peaks at a second position on the track. The magnetic pole and the heating element are disposed so that the first position is located on a trailing side relative to the second position, the trailing side being a front side in the direction of travel of the magnetic recording medium relative to the thermally-assisted magnetic recording head, and so that the distribution of write magnetic field strength and the distribution of temperature partially overlap each other.

The front end face of the magnetic pole has a main portion, a first extended portion, and a second extended portion. The main portion has: a first end portion that is located on the trailing side and has a length in the track width direction; a second end portion that is located on a leading side, the leading side being a rear side in the direction of travel of the magnetic recording medium relative to the thermally-assisted magnetic recording head; and a first side portion and a second side portion that are opposite to each other in the track width direction. The first extended portion is extended in the track width direction from a part of the first side portion, the part of the first side portion being located on the leading side relative to a center of the main portion in the direction of travel of the magnetic recording medium. The second extended portion is extended in the track width direction from a part of the second side portion, the part of the second side portion being located on the leading side relative to the center of the main portion in the direction of travel of the magnetic recording medium.

The first extended portion has a first side end that is farthest from the first side portion. The second extended portion has a second side end that is farthest from the second side portion. The distance between the first side end and the second side end in the track width direction is in the range of 2.3 to 20 times the length of the first end portion.

In the thermally-assisted magnetic recording head of the present invention, the first position may be located on the trailing side relative to the second end portion.

In the thermally-assisted magnetic recording head of the present invention, the heating element may be an element that generates near-field light.

In the thermally-assisted magnetic recording head of the present invention, an end of the first extended portion on the leading side and an end of the second extended portion on the leading side may be in line with the second end portion of the main portion. Alternatively, the first extended portion and the second extended portion may be located on the trailing side relative to the second end portion of the main portion.

In the thermally-assisted magnetic recording head of the present invention, each of the first and second extended portions may have a dimension of 30 to 250 nm in the direction of travel of the magnetic recording medium.

A method of manufacturing the thermally-assisted magnetic recording head of the present invention includes the step of forming the heating element and the step of forming the magnetic pole. The step of forming the magnetic pole may include the steps of forming a seed layer made of a magnetic material; and forming a plating layer made of a magnetic material on the seed layer by plating. The plating layer is smaller than the seed layer in length in the track width direction. The first and second extended portions of the front end face of the magnetic pole are each formed of part of the seed layer.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

In the thermally-assisted magnetic recording head, the method of manufacturing the same, the head gimbal assembly, and the magnetic recording device of the present invention, the front end face of the magnetic pole has the main portion and the first and second extended portions. This allows the first position at which the write magnetic field strength peaks to move toward the leading side when compared with the case where the front end face of the magnetic pole has only the main portion. Consequently, according to the present invention, it is possible to reduce the distance between the peak write magnetic field point (the first position) and the peak heat point (the second position) beyond the limit resulting from the arrangement of the magnetic pole and the heating element.

Other and further objects, features and advantages of the present invention will appear more fully from the following description.

DETAILED DESCRIPTION OF THE PREFERRED EMBODIMENTS

First Embodiment

Figure 5:
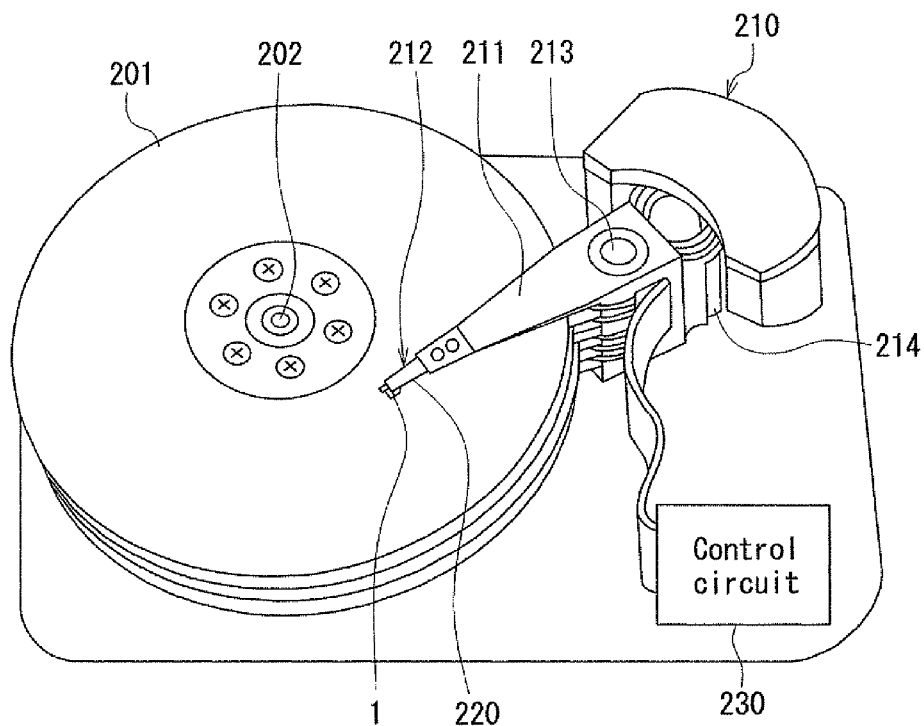
FIG. 5 is a perspective view showing a magnetic recording device according to the first embodiment of the invention.

Preferred embodiments of the present invention will now be described in detail with reference to the drawings. First, reference is made to FIG. 5 to describe a magnetic disk drive that functions as a magnetic recording device according to a first embodiment of the invention. As shown in FIG. 5, the magnetic disk drive includes a plurality of magnetic disks 201 serving as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning the thermally-assisted magnetic recording heads 1 on tracks which are concentrically formed in the magnetic recording layer of each magnetic disk 201. The tracks are the area of the magnetic recording layer where to write data. Each track is provided with a plurality of record bits formed in a row. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 6:
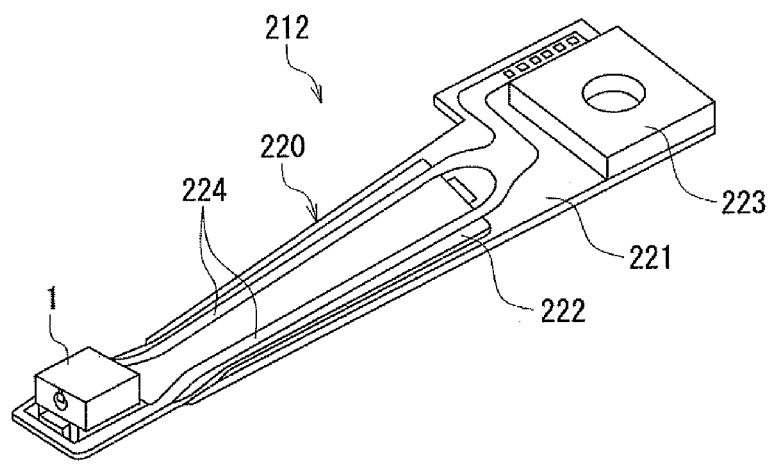
FIG. 6 is a perspective view showing a head gimbal assembly according to the first embodiment of the invention.

FIG. 6 is a perspective view showing the head gimbal assembly 212 of FIG. 5. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 6. For example, the head gimbal assembly of the present invention may have an IC chip for driving the head that is mounted somewhere along the suspension 220.

Figure 7:
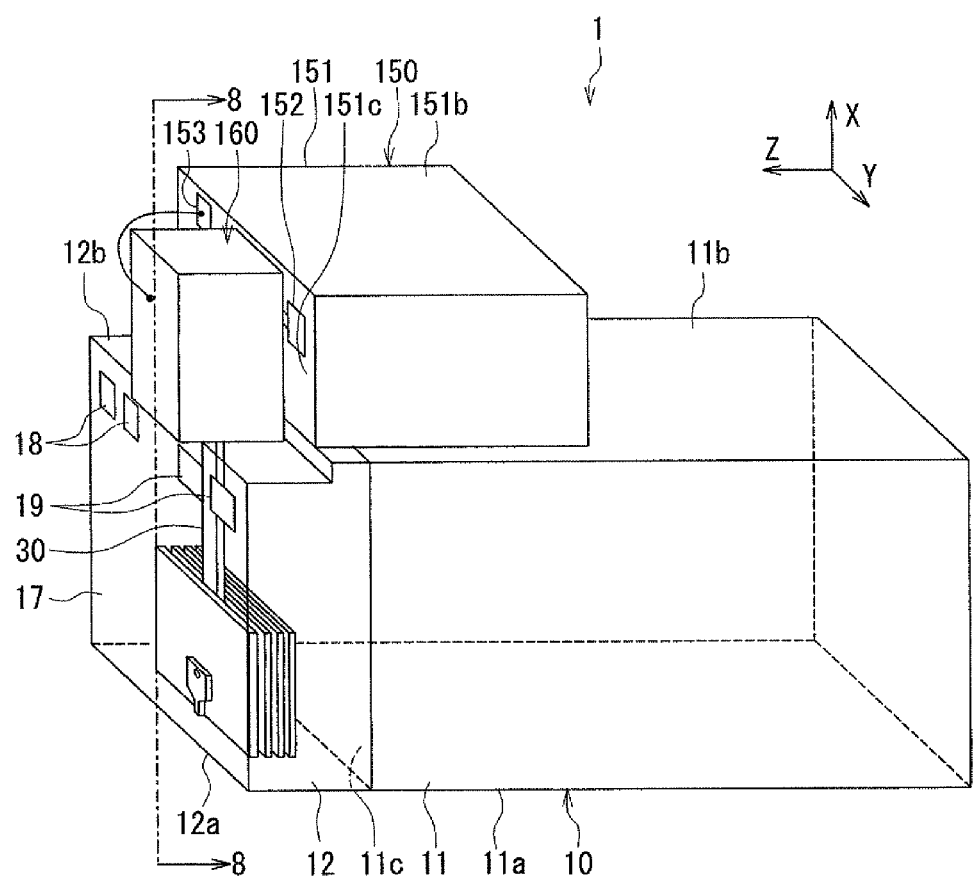
FIG. 7 is a perspective view showing the thermally-assisted magnetic recording head according to the first embodiment of the invention.
Figure 8:
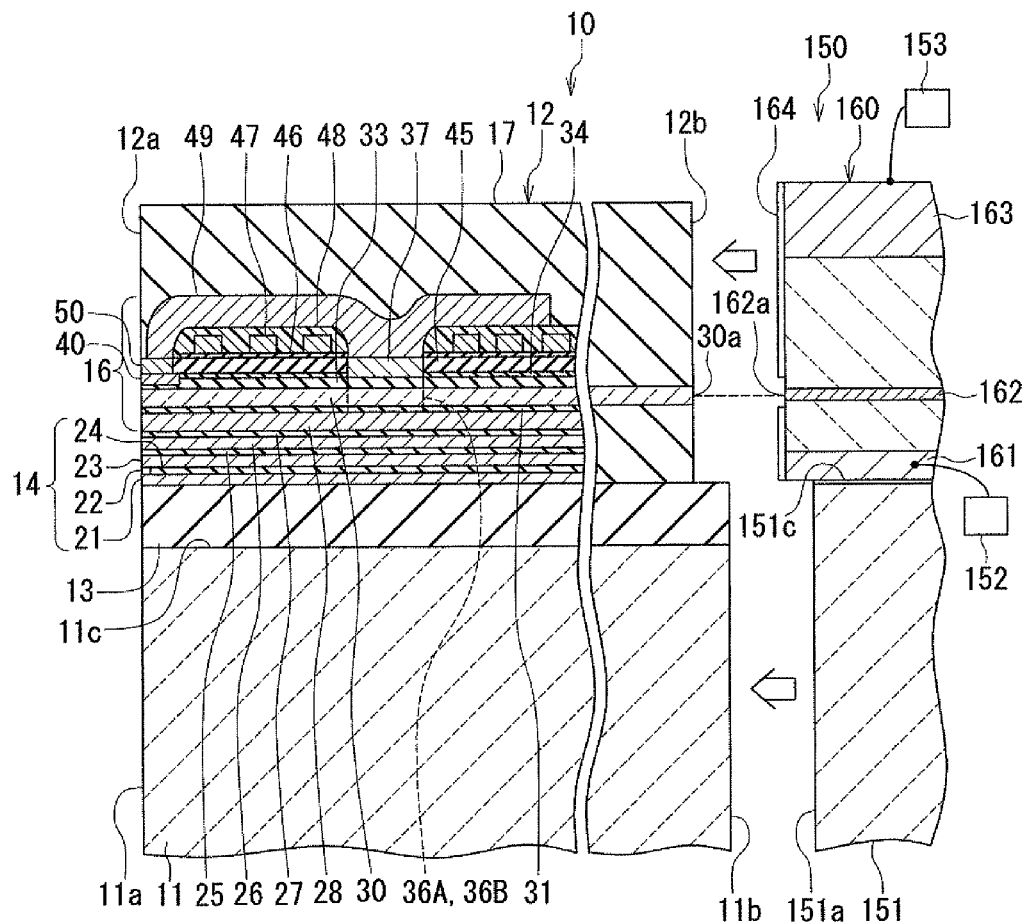
FIG. 8 shows a cross section taken along line 8-8 of FIG. 7.
Figure 8:
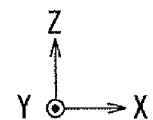

The configuration of the thermally-assisted magnetic recording head 1 according to the present embodiment will now be described with reference to FIG. 7 and FIG. 8. FIG. 7 is a perspective view showing the thermally-assisted magnetic recording head 1. FIG. 8 shows a cross section taken along line 8-8 of FIG. 7. The thermally-assisted magnetic recording head 1 includes a slider 10 and a light source unit 150. FIG. 8 shows a state where the slider 10 and the light source unit 150 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c is defined as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 8. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The air inflow end (the leading end) of the slider 10 is an end of the medium facing surface 11a in the −Z direction. The outflow end (the trailing end) of the slider 10 is an end of the medium facing surface 12a in the Z direction. Track width direction TW is parallel to the Y direction.

Furthermore, the side of positions closer to the leading end relative to a reference position will be defined as the leading side, and the side of positions closer to the trailing end relative to the reference position will be defined as the trailing side. The leading side is the rear side in the direction of travel of the magnetic disk 201 (the Z direction) relative to the slider 10. The trailing side is the front side in the direction of travel of the magnetic disk 201 (the Z direction) relative to the slider 10.

The light source unit 150 includes a laser diode 160 serving as a light source for emitting laser light, and a support member 151 that is in the shape of a rectangular solid and supports the laser diode 160. The support member 151 is made of, for example, a ceramic material such as aluminum oxide-titanium carbide ($Al_2O_3$—TiC). The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c. The support member 151 may function as a heat sink for dissipating heat generated by the laser diode 160, as well as serving to support the laser diode 160.

As shown in FIG. 8, the head section 12 includes an insulating layer 13 disposed on the element-forming surface 11c, and also includes a read head section 14, a write head section 16, and a protective layer 17 that are stacked in this order on the insulating layer 13. The insulating layer 13 and the protective layer 17 are each made of an insulating material such as $Al_2O_3$ (hereinafter, also referred to as alumina).

The read head section 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 25 disposed on the top shield layer 23, a middle shield layer 26 disposed on the insulating layer 25, and an insulating layer 27 disposed on the middle shield layer 26. The middle shield layer 26 functions to shield the MR element 22 from a magnetic field produced in the write head section 16. The insulating layers 25 and 27 are each made of an insulating material such as alumina. The middle shield layer 26 is made of a soft magnetic material. The insulating layer 25 and the middle shield layer 26 may be omitted.

The write head section 16 is for use in perpendicular magnetic recording. The write head section 16 includes a return yoke layer 28 disposed on the insulating layer 27, and a not-shown insulating layer disposed on the insulating layer 27 and surrounding the return yoke layer 28. The return yoke layer 28 is made of a soft magnetic material. The return yoke layer 28 has an end face located in the medium facing surface 12a. The top surfaces of the return yoke layer 28 and the not-shown insulating layer are even with each other.

Figure 1:
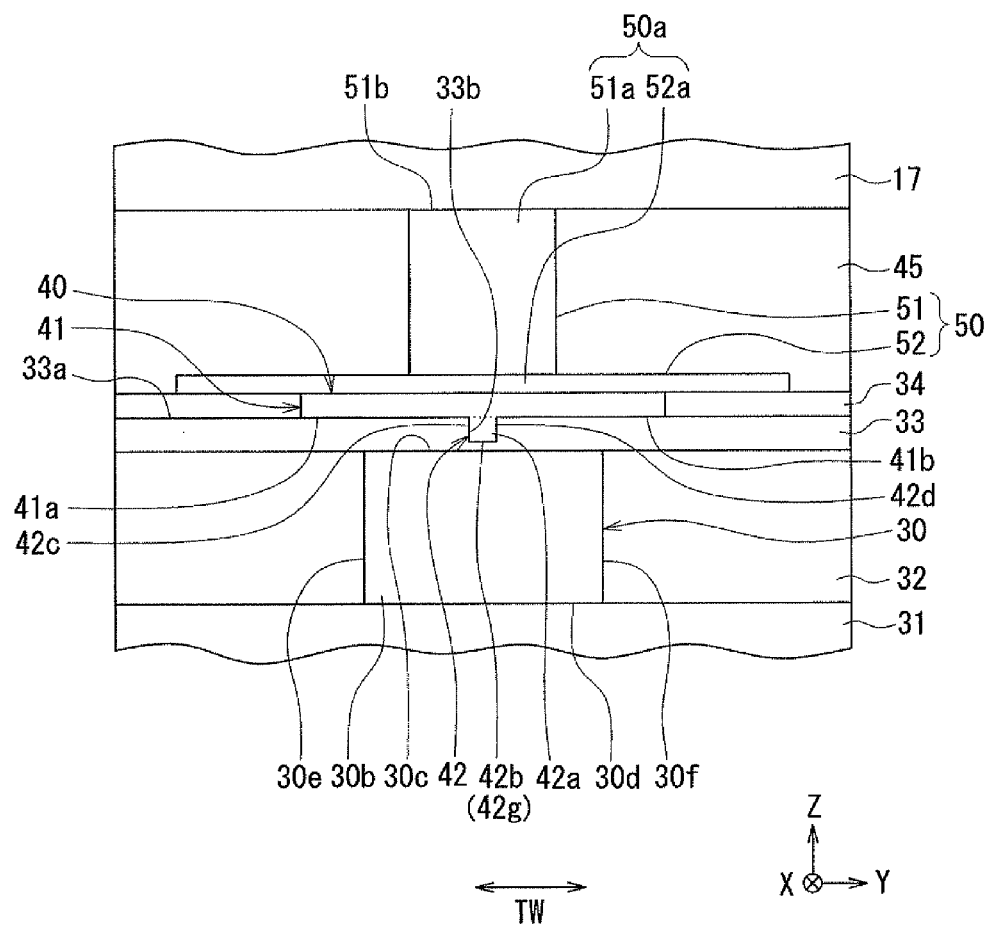
FIG. 1 is a front view showing the main part of a thermally-assisted magnetic recording head according to a first embodiment of the invention.

The write head section 16 further includes a waveguide including a core 30 and a cladding. The cladding includes cladding layers 31, 32, and 33. The cladding layer 31 is disposed over the return yoke layer 28 and the not-shown insulating layer. The core 30 is disposed on the cladding layer 31. The cladding layer 32 is disposed on the cladding layer 31 and surrounds the core 30. The cladding layer 32 is not shown in FIG. 8 but is shown in FIG. 1, which will be described later. The cladding layer 33 is disposed over the core 30 and the cladding layer 32.

The core 30 extends in the direction perpendicular to the medium facing surface 12a (the X direction). The core 30 has an incidence end 30a, and a front end face opposite thereto. The core 30 allows laser light that is emitted from the laser diode 160 and incident on the incidence end 30a to propagate through.

The core 30 is made of a dielectric material that transmits the laser light. Each of the cladding layers 31, 32 and 33 is made of a dielectric material and has a refractive index lower than that of the core 30. For example, if the laser light has a wavelength of 600 nm and the core 30 is made of $Al_2O_3$ (refractive index n=1.63), the cladding layers 31, 32 and 33 may be made of $SiO_2$ (refractive index n=1.46). If the core 30 is made of tantalum oxide such as $Ta_2O_5$ (n=2.16), the cladding layers 31, 32 and 33 may be made of $SiO_2$ (n=1.46) or $Al_2O_3$ (n=1.63).

The write head section 16 further includes: a plasmon generator 40 disposed above the core 30 in the vicinity of the medium facing surface 12a; a dielectric layer 34 disposed on the cladding layer 33 and surrounding the plasmon generator 40; and a magnetic pole 50 disposed such that the plasmon generator 40 is interposed between the core 30 and the magnetic pole 50. The plasmon generator 40 is an element that generates near-field light and applies heat to the magnetic disk 201 through the use of the near-field light. The plasmon generator 40 is thus a heating element that applies heat to the magnetic disk 201. The plasmon generator 40 is embedded in the cladding layer 33 and the dielectric layer 34.

The plasmon generator 40 is made of a conductive material such as metal. For example, the plasmon generator 40 may be made of one element selected from the group consisting of Au, Ag, Cu, and Al, or of an alloy composed of two or more of these elements. The magnetic pole 50 is made of a soft magnetic material, or a magnetic metal material in particular. The dielectric layer 34 is made of $SiO_2$, for example. The shapes and the arrangement of the core 30, the plasmon generator 40, and the magnetic pole 50 will be described in detail later.

The write head section 16 further includes two coupling portions 36A and 36B located away from the medium facing surface 12a and embedded in the cladding layers 31, 32 and 33. The coupling portions 36A and 36B are made of a soft magnetic material. The coupling portions 36A and 36B are located on opposite sides of the core 30 in the track width direction TW, and are each spaced from the core 30. The bottom surfaces of the coupling portions 36A and 36B are in contact with the top surface of the return yoke layer 28.

The write head section 16 further includes a coupling layer 37 penetrating the dielectric layer 34. The coupling layer 37 is made of a soft magnetic material. The coupling layer 37 is located above the core 30. The bottom surface of the coupling layer 37 is in contact with the top surfaces of the coupling portions 36A and 36B.

The write head section 16 further includes: an insulating layer 45 disposed around the magnetic pole 50 and the coupling layer 37; an insulating layer 46 disposed on the insulating layer 45; a coil 47 disposed on the insulating layer 46; and an insulating layer 48 covering the coil 47. The coil 47 is planar spiral-shaped and wound around the coupling layer 37. The coil 47 produces a magnetic field corresponding to data to be written on the magnetic disk 201. The coil 47 is made of a conductive material such as copper.

The write head section 16 further includes a yoke layer 49. The yoke layer 49 is disposed over the magnetic pole 50, the insulating layer 48 and the coupling layer 37. The yoke layer 49 is in contact with the top surface of the magnetic pole 50 at a position near the medium facing surface 12a, and in contact with the top surface of the coupling layer 37 at a position away from the medium facing surface 12a. The yoke layer 49 is made of a soft magnetic material.

In the write head section 16, a magnetic path for passing a magnetic flux corresponding to the magnetic field produced by the coil 47 is formed by the return yoke layer 28, the coupling portions 36A and 36B, the coupling layer 37, the yoke layer 49, and the magnetic pole 50. The magnetic pole 50 has a front end face located in the medium facing surface 12a. The magnetic pole 50 allows the magnetic flux corresponding to the magnetic field produced by the coil 47 to pass, and produces a write magnetic field for writing data on the magnetic disk 201.

As shown in FIG. 8, the protective layer 17 is disposed to cover the write head section 16. As shown in FIG. 7, the head section 12 further includes a pair of terminals 18 that are disposed on the top surface of the protective layer 17 and electrically connected to the MR element 22, and a pair of terminals 19 that are disposed on the top surface of the protective layer 17 and electrically connected to the coil 47. These terminals 18 and 19 are electrically connected to the plurality of pad-shaped terminals of the wiring member 224 shown in FIG. 6.

The laser diode 160 may be a laser diode of InP type, GaAs type, GaN type or the like that is commonly used for such applications as communications, optical disc storage and material analysis. The laser diode 160 may emit laser light of any wavelength within the range of, for example, 375 nm to 1.7 µm. Specifically, the laser diode 160 may be an InGaAsP/InP quarternary mixed crystal laser diode having an emittable wavelength range of 1.2 to 1.67 µm, for example.

As shown in FIG. 8, the laser diode 160 has a multilayer structure including a lower electrode 161, an active layer 162, and an upper electrode 163. A reflecting layer 164 made of, for example, $SiO_2$ or $Al_2O_3$, is formed on two cleavage planes of the multilayer structure so as to excite oscillation by total reflection of light. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 6. When a predetermined voltage is applied to the laser diode 160 through the terminals 152 and 153, laser light is emitted from the emission center 162a of the laser diode 160. The laser light emitted from the laser diode 160 is preferably TM-mode polarized light whose electric field oscillates in a direction perpendicular to the plane of the active layer 162.

The laser diode 160 can be driven by a power supply inside the magnetic disk drive. The magnetic disk drive usually includes a power supply that generates a voltage of 5 V or so, for example. This supply voltage is sufficient to drive the laser diode 160. The laser diode 160 has a power consumption of, for example, several tens of milliwatts or so, which can be adequately covered by the power supply in the magnetic disk drive.

The light source unit 150 is secured to the slider 10 by bonding the bond surface 151a of the support member 151 to the rear surface 11b of the slider substrate 11, as shown in FIG. 8. The laser diode 160 and the core 30 are positioned with respect to each other so that the laser light emitted from the laser diode 160 will be incident on the incidence end 30a of the core 30.

Figure 3:
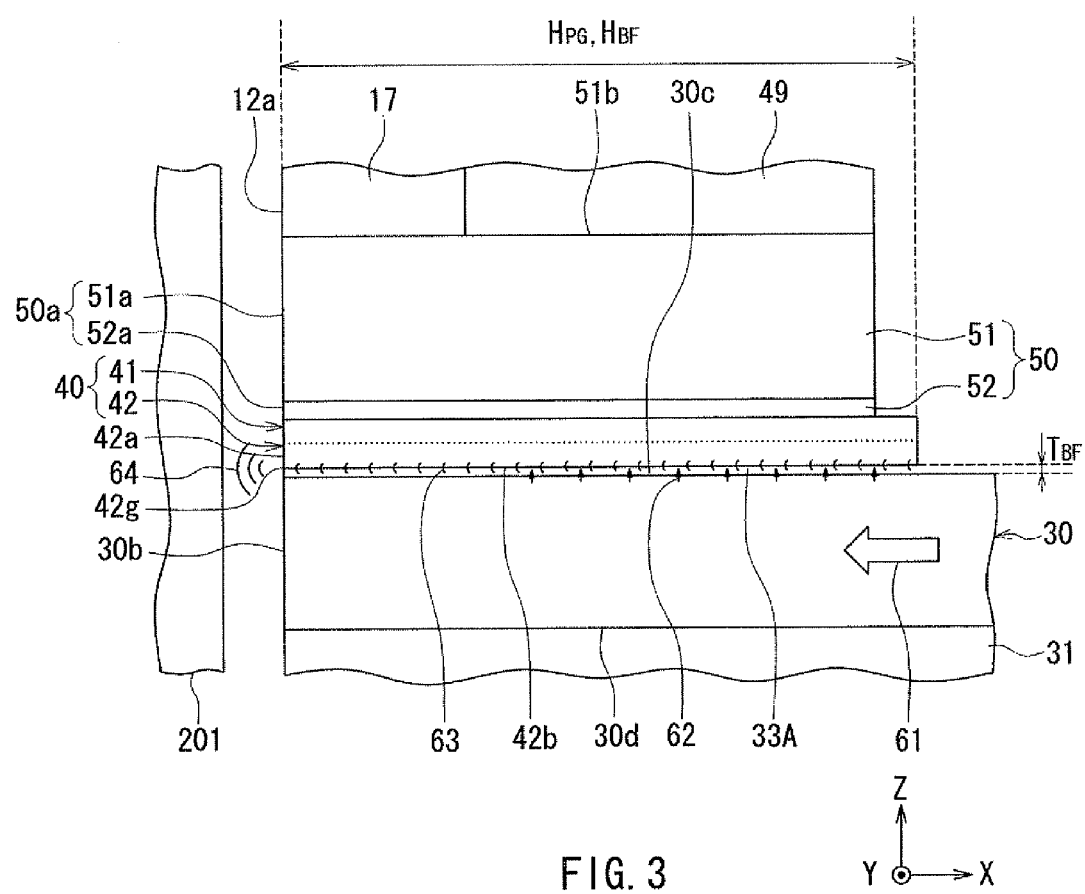
FIG. 3 is a cross-sectional view showing the main part of the thermally-assisted magnetic recording head according to the first embodiment of the invention.
Figure 4:
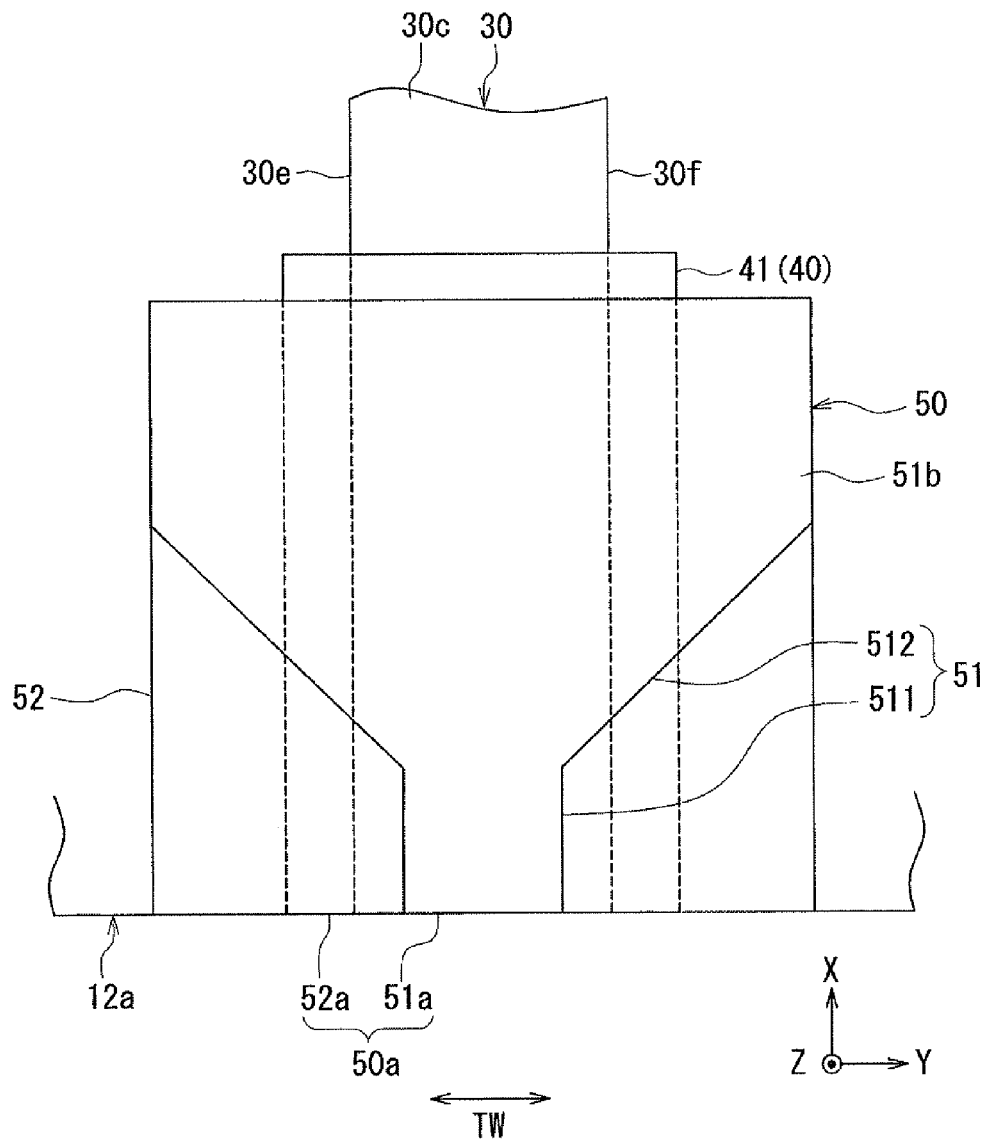
FIG. 4 is a plan view showing the main part of the thermally-assisted magnetic recording head according to the first embodiment of the invention.

Reference is now made to FIG. 1, FIG. 3, and FIG. 4 to describe the shapes and the arrangement of the core 30, the plasmon generator 40, and the magnetic pole 50. FIG. 1 is a front view showing the main part of the thermally-assisted magnetic recording head 1. FIG. 1 shows part of the medium facing surface 12a. FIG. 3 is a cross-sectional view showing the main part of the thermally-assisted magnetic recording head 1. FIG. 3 shows a cross section perpendicular to the element-forming surface 11c and the medium facing surface 12a. FIG. 4 is a plan view showing the main part of the thermally-assisted magnetic recording head 1.

The core 30 has the incidence end 30a shown in FIG. 8 and further has: a front end face 30b which is closer to the medium facing surface 12a; an evanescent light generating surface 30c which is a top surface; a bottom surface 30d; and two side surfaces 30e and 30f. FIG. 1, FIG. 3, and FIG. 4 show an example where the front end face 30b is located in the medium facing surface 12a; however, the front end face 30b may be located away from the medium facing surface 12a. The evanescent light generating surface 30c generates evanescent light based on the light propagating through the core 30. The evanescent light generating surface 30c is perpendicular to the Z direction. The core 30 is located on the leading side relative to the plasmon generator 40. A portion of the cladding layer 33 is interposed between the core 30 and the plasmon generator 40.

As shown in FIG. 1, the cladding layer 33 has a top surface 33a located above the core 30, and a groove 33b that opens in the top surface 33a and is located above the core 30. The groove 33b extends in the direction perpendicular to the medium facing surface 12a (the X direction). The groove 33b is rectangular in cross section parallel to the medium facing surface 12a.

The plasmon generator 40 includes a base part 41, and a protruding part 42 protruding from the base part 41 toward the evanescent light generating surface 30c. The base part 41 is shaped like a flat pate, for example. In FIG. 1 and FIG. 3, the boundary between the base part 41 and the protruding part 42 is shown by a dotted line. The groove 33b mentioned above is provided to accommodate the protruding part 42.

The base part 41 has a first base surface 41a and a second base surface 41b that face toward the evanescent light generating surface 30c and are located on opposite sides of the protruding part 42 in the direction parallel to the evanescent light generating surface 30c and the medium facing surface 12a (the Y direction). The first and second base surfaces 41a and 41b are parallel to the evanescent light generating surface 30c.

The protruding part 42 has: a front end face 42a located at an end in the direction perpendicular to the medium facing surface 12a (the X direction); a flat surface 42b that is band-shaped, parallel to the evanescent light generating surface 30c and elongated in the direction perpendicular to the medium facing surface 12a (the X direction) and faces toward the evanescent light generating surface 30c; and a first side surface 42c and a second side surface 42d that are at a distance from each other. The flat surface 42b is located closer to the evanescent light generating surface 30c than are the first and second base surfaces 41a and 41b. The first side surface 42c connects the flat surface 42b to the first base surface 41a. The second side surface 42d connects the flat surface 42b to the second base surface 41b. The first and second side surfaces 42c and 42d are parallel to each other.

The front end face 42a of the protruding part 42 includes a near-field light generating part 42g that generates near-field light. More specifically, the near-field light generating part 42g is an end of the front end face 42a intersecting the flat surface 42b, or refers to this end and a part therearound.

As shown in FIG. 3, the cladding layer 33 has a portion interposed between the evanescent light generating surface 30c and the flat surface 42b, and this portion of the cladding layer 33 forms a buffer part 33A that has a refractive index lower than that of the core 30.

In the present embodiment, the base part 41 and the protruding part 42 are equal in length in the X direction. As shown in FIG. 3, the length of the base part 41 and the protruding part 42 in the X direction will be represented by the symbol $H_{PG}$. $H_{PG}$ falls within the range of 0.5 to 2.0 µm, for example. The length of a portion of the flat surface 42b of the protruding part 42 in the X direction, the portion being opposed to the evanescent light generating surface 30c, will be represented by the symbol $H_{BF}$. The distance between the flat surface 42b and the evanescent light generating surface 30c will be represented by the symbol $T_{BF}$. Both $H_{BF}$ and $T_{BF}$ are important parameters in achieving appropriate excitation and propagation of surface plasmons. $H_{BF}$ falls within the range of 0.5 to 2.0 µm, for example. In the example shown in FIG. 3, the front end face 30b of the core 30 is located in the medium facing surface 12a, so that $H_{BF}$ is equal to $H_{PG}$. $T_{BF}$ falls within the range of 10 to 80 nm, for example. The distance between the near-field light generating part 42g of the front end face 42a of the protruding part 42 and the front end face 30b of the core 30 is equal to $T_{BF}$.

The difference in level between the flat surface 42b and each of the first and second base surfaces 41a and 41b in the Z direction falls within the range of 20 to 50 nm, for example. The flat surface 42b has a dimension in the Y direction (width) of 5 to 35 nm, for example. The base part 41 has a dimension in the Y direction (width) of 0.3 to 30 µm, for example. The base part 41 has a dimension in the Z direction (thickness) of 30 to 300 nm, for example.

A portion of the core 30 in the vicinity of the plasmon generator 40 has a dimension in the Y direction (width) of 0.3 to 1 µm, for example. The remaining portion of the core 30 may have a width greater than that of the portion of the core 30 in the vicinity of the plasmon generator 40. The portion of the core 30 in the vicinity of the plasmon generator 40 has a dimension in the Z direction (thickness) of 0.3 to 0.6 µm, for example.

The magnetic pole 50 has a front end face 50a located in the medium facing surface 12a. The magnetic pole 50 includes a first layer 51 constituting most part of the volume of the magnetic pole 50 and a second layer 52 located between the first layer 51 and the plasmon generator 40. As shown in FIG. 1 and FIG. 3, the first layer 51 has an end face 51a located in the medium facing surface 12a, and a top surface 51b. As shown in FIG. 4, the first layer 51 includes a track width defining portion 511 and a wide portion 512. The track width defining portion 511 has a first end located in the medium facing surface 12a and a second end opposite to the first end. The wide portion 512 is connected to the second end of the track width defining portion 511. The width of the top surface 51b in the track width direction TW is greater in the wide portion 512 than in the track width defining portion 511.

In the track width defining portion 511, the width of the top surface 51b in the track width direction TW is generally constant regardless of the distance from the medium facing surface 12a. In the wide portion 512, the width of the top surface 51b in the track width direction TW is, for example, equal to that in the track width defining portion 511 when seen at the boundary between the track width defining portion 511 and the wide portion 512, and gradually increases with increasing distance from the medium facing surface 12a, then becoming constant. Here, the length of the track width defining portion 511 in the direction perpendicular to the medium facing surface 12a will be referred to as the neck height. The neck height falls within the range of 0 to 0.3 μm, for example. A zero neck height means that no track width defining portion 511 exists and an end face of the wide portion 412 is thus located in the medium facing surface 12a.

The second layer 52 is shaped like a flat plate, for example. In the vicinity of the medium facing surface 12a, as shown in FIG. 4, the outer edges of the second layer 52 lie outside the outer edges of the first layer 51 as viewed from above. As shown in FIG. 1 and FIG. 3, the second layer 52 has an end face 52a located in the medium facing surface 12a.

Figure 2:
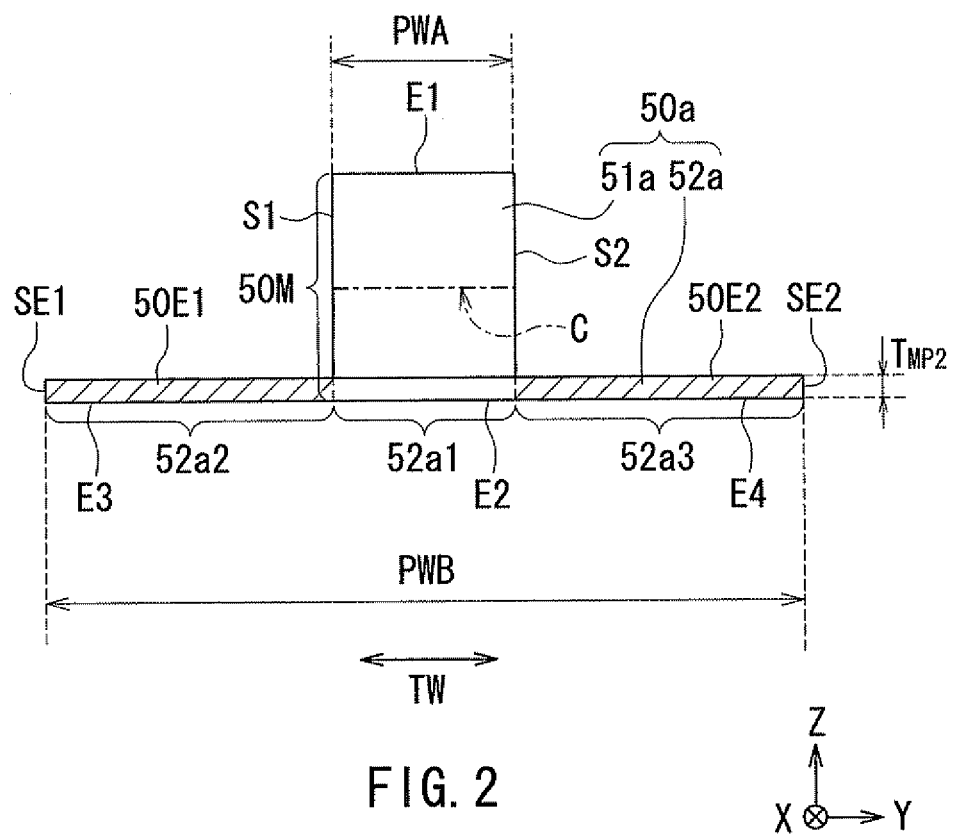
FIG. 2 is a front view showing a front end face of a magnetic pole of the first embodiment of the invention.

The front end face 50a of the magnetic pole 50 will now be described in more detail with reference to FIG. 2. FIG. 2 is a front view showing the front end face 50a of the magnetic pole 50. The front end face 50a of the magnetic pole 50 is composed of the end face 51a of the first layer 51 and the end face 52a of the second layer 52. The end face 52a includes a first portion 52a1 that is located directly below the end face 51a of the first layer 51, and a second portion 52a2 and a third portion 52a3 that are located on opposite sides of the first portion 52a1 in the track width direction TW. In FIG. 2, the boundary between the first portion 52a1 and the second portion 52a2 and the boundary between the first portion 52a1 and the third portion 52a3 are shown by broken lines.

The front end face 50a of the magnetic pole 50 has a main portion 50M, a first extended portion 50E1, and a second extended portion 50E2. In FIG. 2, the extended portions 50E1 and 50E2 are hatched in order to illustrate the main portion 50M and the extended portions 50E1 and 50E2 with higher clarity. The main portion 50M is composed of the end face 51a of the first layer 51 and the first portion 52a1 of the end face 52a of the second layer 52. The first extended portion 50E1 is composed of the second portion 52a2 of the end face 52a of the second layer 52. The second extended portion 50E2 is composed of the third portion 52a3 of the end face 52a of the second layer 52.

The main portion 50M has: a first end portion E1 located on the trailing side and having a length PWA in the track width direction TW; a second end portion E2 located on the leading side; and a first side portion S1 and a second side portion S2 opposite to each other in the track width direction TW. The first side portion S1 includes the boundary between the main portion 50M and the first extended portion 50E1. The second side portion S2 includes the boundary between the main portion 50M and the second extended portion 50E2. The first end portion E1 lies at an end of the top surface 51b. The first extended portion 50E1 is extended in the track width direction TW from a part of the first side portion S1, the part of the first side portion S1 being located on the leading side relative to the center C of the main portion 50M in the direction of travel of the magnetic disk 201 (the Z direction). The second extended portion 50E2 is extended in the track width direction TW from a part of the second side portion S2, the part of the second side portion S2 being located on the leading side relative to the aforementioned center C. In the present embodiment, in particular, an end E3 of the first extended portion 50E1 on the leading side and an end E4 of the second extended portion 50E2 on the leading side are in line with the second end portion E2 of the main portion 50M.

The first extended portion 50E1 has a first side end SE1 located farthest from the first side portion S1. The second extended portion 50E2 has a second side end SE2 located farthest from the second side portion S2. As shown in FIG. 2, the distance between the first side end SE1 and the second side end SE2 in the track width direction TW will be represented by the symbol PWB. PWB is preferably in the range of 2.3 to 20 times PWA, and more preferably in the range of 3.3 to 20 times PWA. The reason for this will be described in detail later.

As shown in FIG. 2, the dimension of each of the first and second extended portions 50E1 and 50E2 in the direction of travel of the magnetic disk 201 (the Z direction) will be represented by the symbol $T_{MP2}$. In the present embodiment, $T_{MP2}$ is equal to the dimension in the Z direction (thickness) of the second layer 52 in the medium facing surface 12a. $T_{MP2}$ is preferably in the range of 30 to 250 nm, and more preferably in the range of 100 to 200 nm. The reason for this will be described in detail later.

The present embodiment is configured so that in at least part of the magnetic pole 50 in the vicinity of the medium facing surface 12a, the cross section of the magnetic pole 50 parallel to the medium facing surface 12a has a main portion and first and second extended portions that meet the same requirements as those for the main portion 50M and the first and second extended portions 50E1 and 50E2 of the front end face 50a. FIG. 4 shows an example in which in a part of the magnetic pole 50 extending from the medium facing surface 12a to the second end of the track width defining portion 511, the cross section of the magnetic pole 50 parallel to the medium facing surface 12a has a main portion and first and second extended portions that meet the same requirements as those for the main portion 50M and the first and second extended portions 50E1 and 50E2.

Reference is now made to FIG. 3 to describe the principle of generation of near-field light in the present embodiment and the principle of thermally-assisted magnetic recording using the near-field light. Laser light 61 emitted from the laser diode 160 propagates through the core 30 of the waveguide to reach the vicinity of the plasmon generator 40. Here, the laser light 61 is totally reflected at the evanescent light generating surface 30c. This causes evanescent light 62 to occur from the evanescent light generating surface 30c to permeate into the buffer part 33A. Then, surface plasmons 63 are excited on at least the flat surface 42b of the plasmon generator 40 through coupling with the evanescent light 62. The surface plasmons 63 propagate along the flat surface 42b to the near-field light generating part 42g. Consequently, the surface plasmons 63 concentrate at the near-field light generating part 42g, and the near-field light generating part 42g generates near-field light 64 based on the surface plasmons 63.

The near-field light 64 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 50 for data writing.

Figure 9:
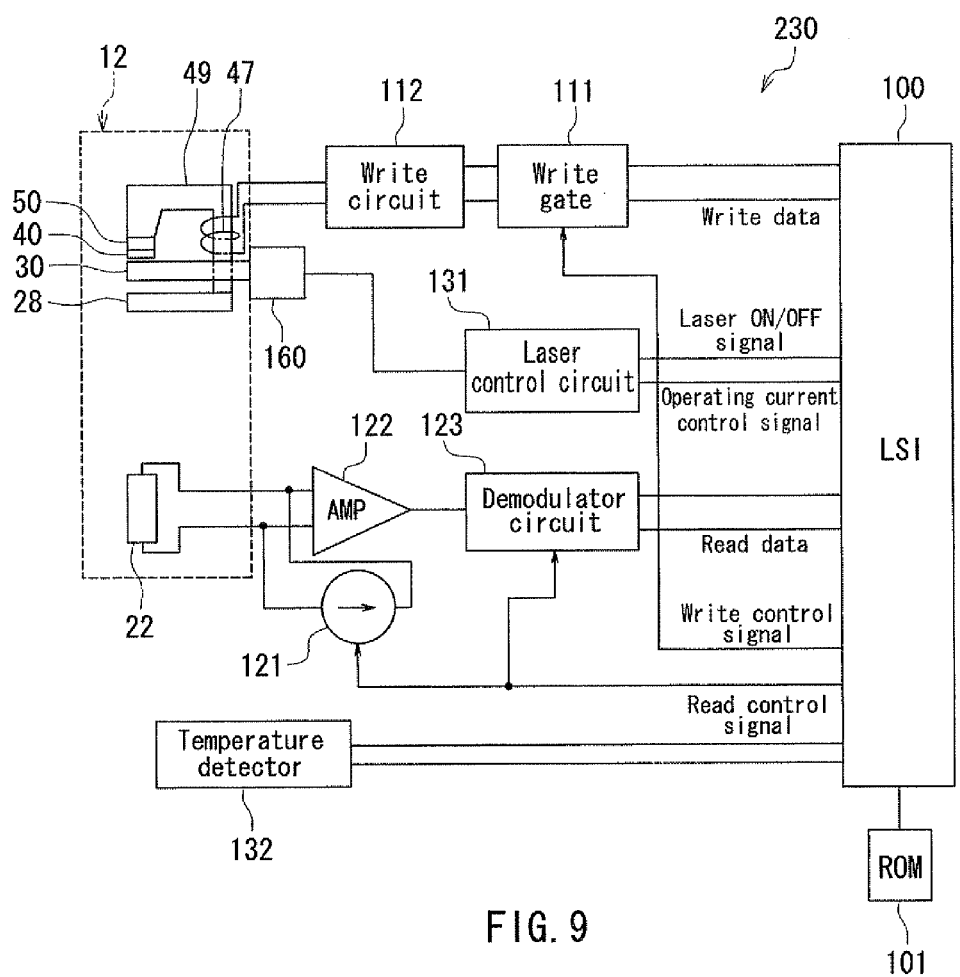
FIG. 9 is a block diagram showing the circuit configuration of the magnetic recording device according to the first embodiment of the invention.

Reference is now made to FIG. 9 to describe the circuit configuration of the control circuit 230 shown in FIG. 5 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 47.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 160 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 160.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 47. Consequently, the magnetic pole 50 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 160 on the basis of the laser ON/OFF signal, and also controls the value of the operating current to be supplied to the laser diode 160 on the basis of the operating current control signal. When the laser ON/OFF signal indicates an ON operation, the laser control circuit 131 exercises control so that an operating current at or above an oscillation threshold is supplied to the laser diode 160. Consequently, the laser diode 160 emits laser light, and the laser light propagates through the core 30. Then, according to the principle of generation of near-field light described previously, the near-field light 64 is generated from the near-field light generating part 42g of the plasmon generator 40. The near-field light 64 heats a part of the magnetic recording layer of the magnetic disk 201, thereby lowering the coercivity of that part. When writing, the part of the magnetic recording layer with the lowered coercivity is subjected to the write magnetic field produced by the magnetic pole 50 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 160. Using the operating current control signal, the control LSI 100 controls the laser control circuit 131 so that the operating current of that value is supplied to the laser diode 160. The control table contains, for example, data that indicates the oscillation threshold and the temperature dependence of the light output versus operating current characteristic of the laser diode 160. The control table may further contain data that indicates the relationship between the operating current value and a temperature increase of the magnetic recording layer heated by the near-field light 64, and data that indicates the temperature dependence of the coercivity of the magnetic recording layer.

As shown in FIG. 9, the control circuit 230 has the signal system for controlling the laser diode 160, i.e., the signal system consisting of the laser ON/OFF signal and the operating current control signal, independent of the control signal system intended for read/write operations. This configuration makes it possible to implement various modes of energization of the laser diode 160, not only to energize the laser diode 160 simply in association with a write operation. It should be noted that the control circuit 230 may have any configuration other than the configuration shown in FIG. 9.

Now, a description will be given of a method of manufacturing the thermally-assisted magnetic recording head 1 according to the present embodiment. The method of manufacturing the thermally-assisted magnetic recording head 1 includes the steps of: manufacturing the slider 10; and securing the light source unit 150 onto the slider 10. The step of manufacturing the slider 10 includes the steps of forming components of a plurality of sliders 10 except the slider substrates 11 on a substrate that includes portions to become the slider substrates 11 of the plurality of sliders 10, thereby fabricating a substructure including a plurality of pre-slider portions aligned in rows, the plurality of pre-slider portions being intended to become individual sliders 10 later; and forming a plurality of sliders 10 by cutting the substructure to separate the plurality of pre-slider portions from each other. In the step of forming a plurality of sliders 10, the cut surfaces are polished to form the medium facing surfaces 11a and 12a.

The step of fabricating the substructure will now be described. The following descriptions will be focused on a single pre-slider portion. Since the step of fabricating the substructure is a step in the method of manufacturing the thermally-assisted magnetic recording head 1 according to the present embodiment, the following descriptions can also be understood as an explanation of the method of manufacturing the thermally-assisted magnetic recording head 1 according to the present embodiment.

In the step of fabricating the substructure, the parts from the insulating layer 13 to the core 30 and the cladding layer 32 are formed one by one on the element-forming surface 11c (see FIG. 8). The step of forming the plasmon generator 40 and the step of forming the magnetic pole 50 will now be described in detail with reference to FIG. 10 to FIG. 15. FIG. 10 to FIG. 15 are cross-sectional views each showing part of a stack of layers formed in the process of manufacturing the thermally-assisted magnetic recording head 1. FIG. 10 to FIG. 15 each show a cross section taken in the position where the medium facing surface 12a is to be formed.

Figure 10:
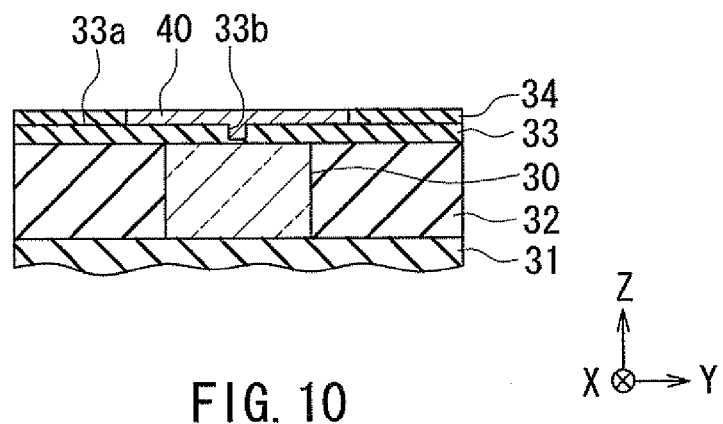
FIG. 10 is a cross-sectional view showing a step of a method of manufacturing the thermally-assisted magnetic recording head according to the first embodiment of the invention.

FIG. 10 shows the step of forming the plasmon generator 40. Here, an example of methods of forming the plasmon generator 40 will be described. In this method, the core 30 and the cladding layer 32 are first formed and then the cladding layer 33 is formed thereon. An etching mask is then formed on the cladding layer 33. The etching mask has an opening shaped to correspond to the planar shape (shape viewed from above) of the protruding part 42 of the plasmon generator 40 to be formed later. The cladding layer 33 is then etched by, for example, reactive ion etching or ion milling using the etching mask to thereby form in the cladding layer 33 the groove 33b shaped to correspond to the protruding part 42. The etching mask is then removed.

Next, a metal film that is to later become the plasmon generator 40 is formed by, for example, sputtering, so as to fill the groove 33b of the cladding layer 33 and cover the entire top surface 33a of the cladding layer 33. The metal film is then partially etched by, for example, ion milling, and thereby patterned. The metal film thus patterned has the same planar shape as that of the base part 41 of the plasmon generator 40. Next, the dielectric layer 34 is formed to cover the metal film. The dielectric layer 34 is then polished by, for example, chemical mechanical polishing (hereinafter referred to as CMP), until the metal film is exposed. This makes the metal film into the plasmon generator 40.

Figure 11:
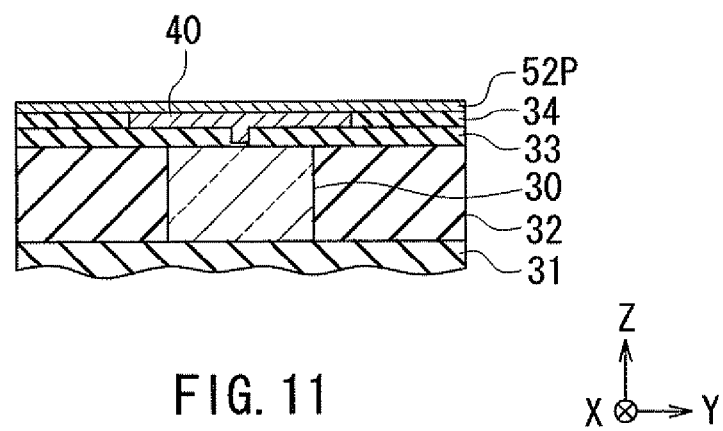
FIG. 11 is a cross-sectional view showing a step that follows the step shown in FIG. 10.

FIG. 11 shows the next step. In this step, a seed layer 52P made of a magnetic material is formed over the entire top surface of the stack. The seed layer 52P is to be partially etched later into the second layer 52 of the magnetic pole 50.

Figure 12:
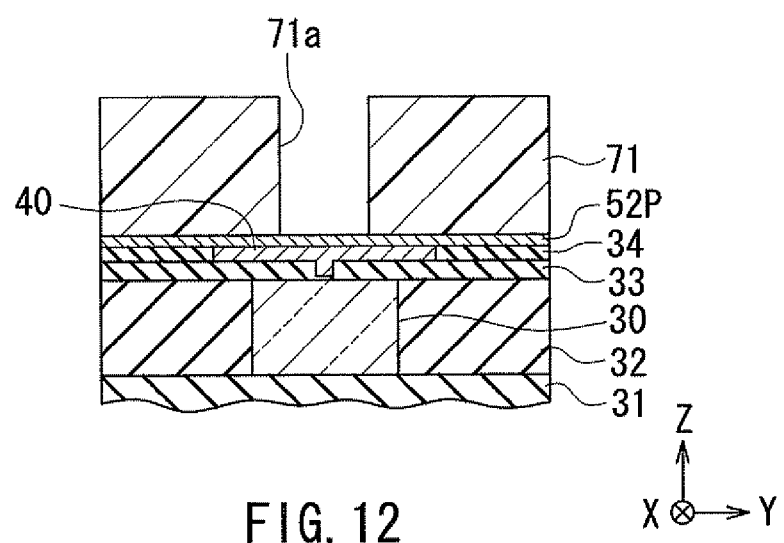
FIG. 12 is a cross-sectional view showing a step that follows the step shown in FIG. 11.

FIG. 12 shows the next step. In this step, a frame 71 for forming the first layer 51 of the magnetic pole 50 is formed on the seed layer 52P. The frame 71 is formed by patterning a photoresist layer by photolithography. The frame 71 has an opening 71a in the area where the first layer 51 of the magnetic pole 50 is to be formed.

Figure 13:
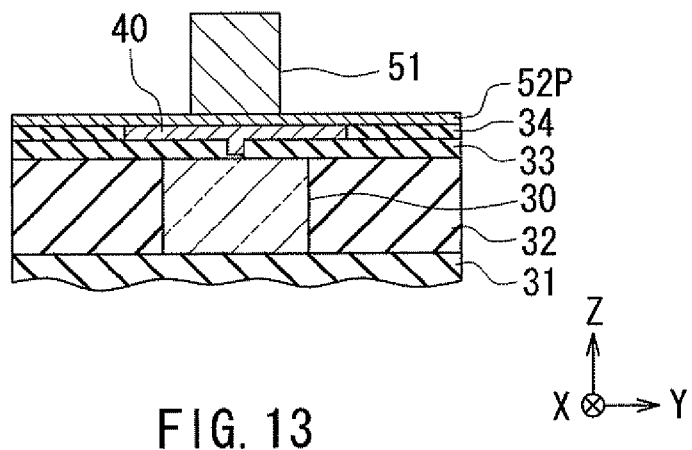
FIG. 13 is a cross-sectional view showing a step that follows the step shown in FIG. 12.

FIG. 13 shows the next step. In this step, first, a plating layer made of a magnetic material, that is, the first layer 51 of the magnetic pole 50, is formed in the opening 71a of the frame 71 by frame plating using the seed layer 52P as an electrode and a seed. The frame 71 is then removed.

Figure 14:
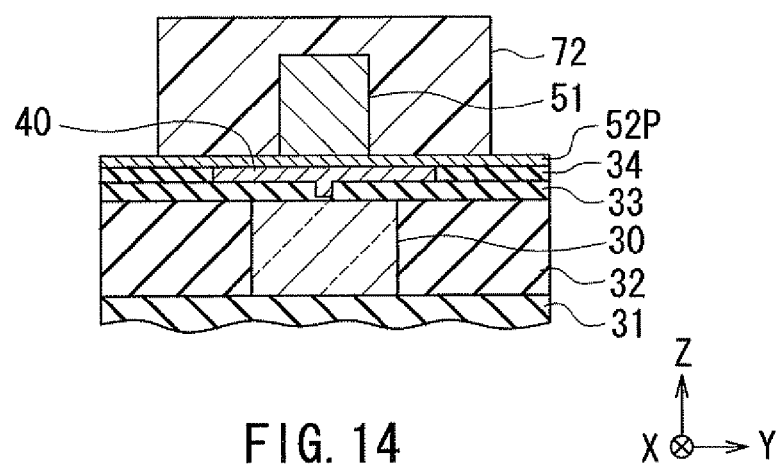
FIG. 14 is a cross-sectional view showing a step that follows the step shown in FIG. 13.

FIG. 14 shows the next step. In this step, a photoresist mask 72 for patterning the seed layer 52P is formed. The photoresist mask 72 is formed by patterning a photoresist layer by photolithography. The photoresist mask 72 covers the first layer 51 of the magnetic pole 50 and part of the seed layer 52P.

Figure 15:
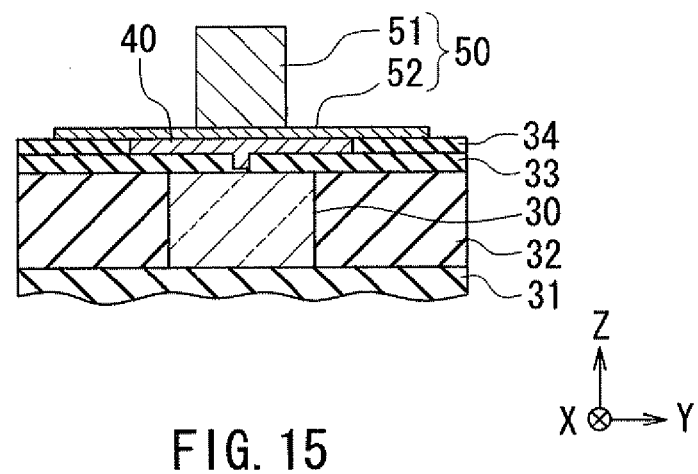
FIG. 15 is a cross-sectional view showing a step that follows the step shown in FIG. 14.

FIG. 15 shows the next step. In this step, first, the seed layer 52P except a portion thereof lying under the photoresist mask 72 and the magnetic pole 50 is etched by, for example, ion milling, using the photoresist mask 72 as the etching mask. This makes the seed layer 52P into the second layer 52 of the magnetic pole 50. The photoresist mask 72 is then removed. The magnetic pole 50 is completed through the series of steps described above.

The coupling layer 37 is formed at the same time when the magnetic pole 50 is formed. After the formation of the magnetic pole 50 and the coupling layer 37, the insulating layer 45 is formed over the entire top surface of the stack. The insulating layer 45 is then polished by, for example, CMP, until the magnetic pole 50 and the coupling layer 37 are exposed. The top surfaces of the magnetic pole 50, the coupling layer 37, and the insulating layer 45 are thereby made even with each other. Then, the remaining components in the pre-slider portion are formed one by one to complete the substructure.

The method of manufacturing the thermally-assisted magnetic recording head 1 according to the present embodiment, which includes the step of fabricating the substructure described above, particularly includes the step of forming the plasmon generator 40, a heating element, and the step of forming the magnetic pole 50. The step of forming the magnetic pole 50 includes the steps of: forming the seed layer 52P made of a magnetic material; and forming the first layer 51, a plating layer made of a magnetic material, on the seed layer 52P by plating. The first layer 51 is smaller than the seed layer 52P in length in the track width direction TW. The first and second extended portions 50E1 and 50E2 of the front end face 50a of the magnetic pole 50 are each formed of a part of the seed layer 52P. The main portion 50M of the front end face 50a is formed of another part of the seed layer 52P and the first layer 51, i.e., the plating layer.

The function and effects of the thermally-assisted magnetic recording head 1 according to the present embodiment will now be described. The thermally-assisted magnetic recording head 1 according to the present embodiment includes: the medium facing surface 12a that faces the magnetic disk 201 having a track formed in the magnetic recording layer; the magnetic pole 50 having the front end face 50a located in the medium facing surface 12a; and the plasmon generator 40 serving as a heating element that applies heat to the magnetic disk 201.

The magnetic pole 50 forms on the track a distribution of write magnetic field strength that peaks at a first position on the track. The plasmon generator 40 forms on the track a distribution of temperature that peaks at a second position on the track. Note that the magnetic recording layer has a thickness and the track has a width. Here, a virtual straight line that is located at the center in the direction of thickness of the magnetic recording layer and the center in the direction of width of the track will be defined as the center line of the track. As used herein, the expression "on the track" means "on the center line of the track" as defined above.

In the present embodiment, the magnetic pole 50 and the plasmon generator 40 are disposed so that the first position mentioned above is located on the trailing side relative to the second position mentioned above, and that the distribution of write magnetic field strength and the distribution of temperature partially overlap each other. The trailing side is the front side in the direction of travel of the magnetic disk 201 (the Z direction) relative to the thermally-assisted magnetic recording head 1. Hereinafter, the first position will also be referred to as the peak write magnetic field point, and the second position will also be referred to as the peak heat point.

On the track, on the trailing side relative to the peak heat point, the temperature decreases and accordingly the coercivity increases as the distance from the peak heat point increases. The direction of magnetization is not determined when the coercivity is lower than the write magnetic field strength, but is determined when the coercivity is equal to or higher than the write magnetic field strength. Accordingly, on the trailing side relative to the peak heat point, the position of the point of intersection of the distribution curve of the coercivity and the distribution curve of the write magnetic field strength determines the position at which a magnetization transition takes place. Hereinafter, this point of intersection will be referred to as the write point.

In the configuration in which the peak write magnetic field point is located on the trailing side relative to the peak heat point like the thermally-assisted magnetic recording head 1 according to the present embodiment, the write point is also located on the trailing side relative to the peak heat point. In this case, the write point and the peak write magnetic field point can conceivably be in the following first or second positional relationship with each other. The first positional relationship is such that the peak write magnetic field point is located at the same position as the write point or on the leading side relative to the write point. The second positional relationship is such that the peak write magnetic field point is located on the trailing side relative to the write point.

Figure 16:
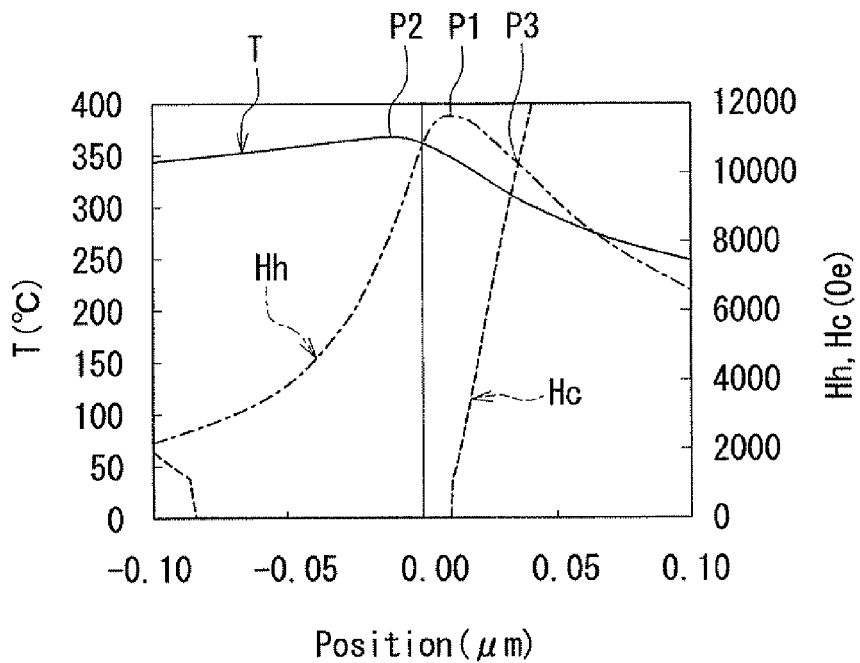
FIG. 16 is a characteristic diagram showing the distribution of write magnetic field strength and the distribution of temperature resulting from a first positional relationship.
Figure 17:
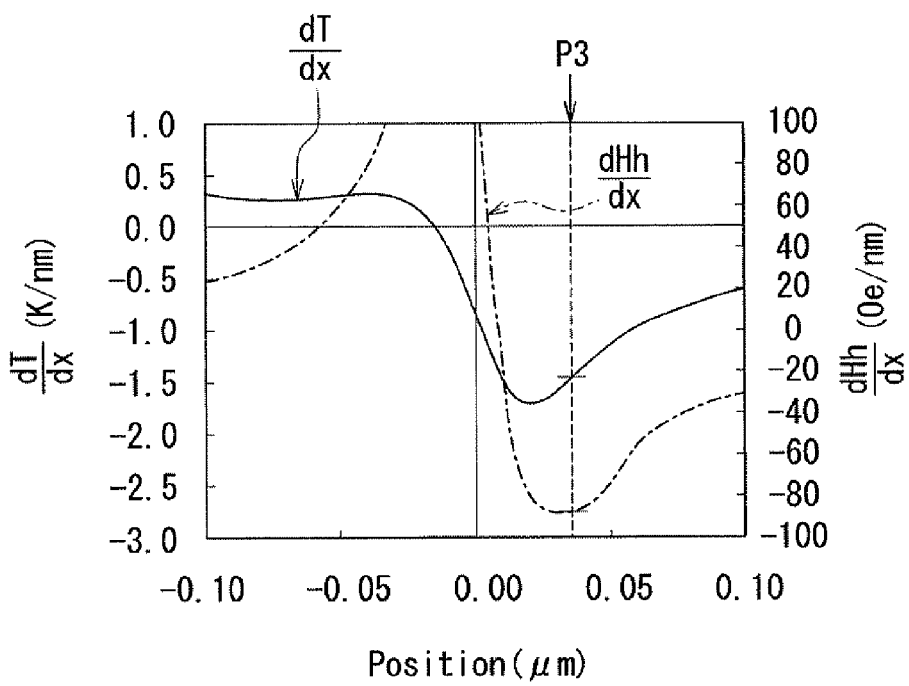
FIG. 17 is a characteristic diagram showing the gradient of write magnetic field strength and the gradient of temperature resulting from the first positional relationship.
Figure 18:
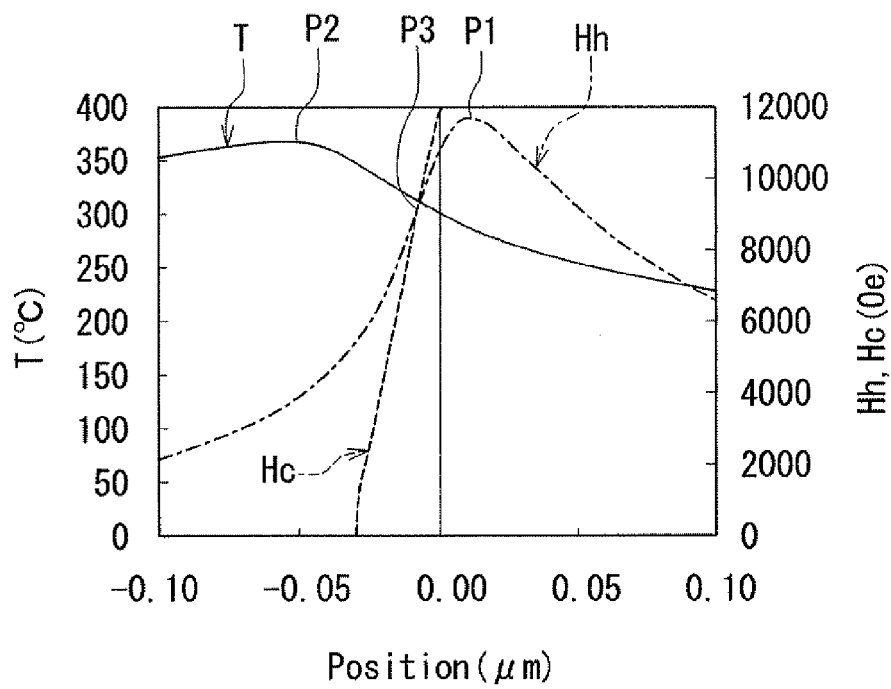
FIG. 18 is a characteristic diagram showing the distribution of write magnetic field strength and the distribution of temperature resulting from a second positional relationship.
Figure 19:
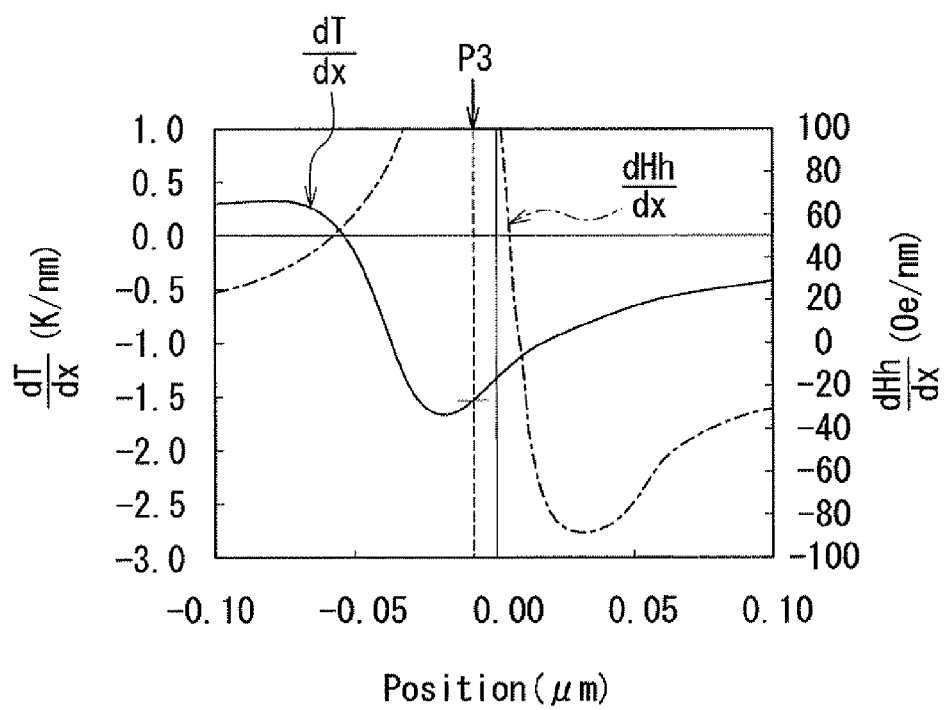
FIG. 19 is a characteristic diagram showing the gradient of write magnetic field strength and the gradient of temperature resulting from the second positional relationship.

Now, with reference to FIG. 16 to FIG. 19, a description will be given of the first positional relationship and the second positional relationship mentioned above. FIG. 16 is a characteristic diagram showing the distribution of write magnetic field strength and the distribution of temperature resulting from the first positional relationship. FIG. 17 is a characteristic diagram showing the gradient of write magnetic field strength and the gradient of temperature resulting from the first positional relationship. FIG. 18 is a characteristic diagram showing the distribution of write magnetic field strength and the distribution of temperature resulting from the second positional relationship. FIG. 19 is a characteristic diagram showing the gradient of write magnetic field strength and the gradient of temperature resulting from the second positional relationship. Note that the gradient of write magnetic field strength refers to the gradient of the change in write magnetic field strength at each position with respect to the change in position on the track. The gradient of temperature refers to the gradient of the change in temperature at each position with respect to the change in position on the track.

In FIG. 16 and FIG. 18, the horizontal axis represents the position on the track (in μm). On the horizontal axis of FIG. 16 and FIG. 18, a position on the track corresponding to the center of the second end portion E2 which lies on the leading side in the front end face 50a of the magnetic pole 50 is assumed as 0 μm, so that positions located on the trailing side relative to this position are expressed in positive values whereas positions located on the leading side relative to this position are expressed in negative values. Note that the position on the track corresponding to a specific point on the medium facing surface 12a, such as the center of the second end portion E2 mentioned above, is the position of the point of intersection of the center line of the track and a virtual straight line that passes through the specific point and is perpendicular to the surface of the magnetic disk 201.

In FIG. 16 and FIG. 18, the left-side vertical axis represents the temperature T (in ° C.) of the magnetic recording layer on the track, while the right-side vertical axis represents the coercivity Hc of the magnetic recording layer on the track and the write magnetic field strength Hh on the track (in Oe). Note that 1 Oe=79.6 A/m. Furthermore, in FIG. 16 and FIG. 18, the solid curve represents the temperature T, the broken curve represents the coercivity Hc, and the dash-dot curve represents the write magnetic field strength Hh. Furthermore, in FIG. 16 and FIG. 18, the symbol P1 indicates the peak write magnetic field point (the first position), the symbol P2 indicates the peak heat point (the second position), and the symbol P3 indicates the write point.

In FIG. 17 and FIG. 19, the horizontal axis represents the position (in μm) on the track in the same manner as in FIG. 16 and FIG. 18. In FIG. 17 and FIG. 19, the left-side vertical axis represents dT/dx or the gradient of temperature T (in K/nm), while the right-side vertical axis represents dHh/dx or the gradient of write magnetic field strength Hh (in Oe/nm). Furthermore, in FIG. 17 and FIG. 19, the solid curve represents dT/dx or the gradient of temperature T, while the dash-dot curve represents dHh/dx or the gradient of write magnetic field strength Hh.

As shown in FIG. 16, the first positional relationship is such that the peak write magnetic field point P1 is located at the same position as the write point P3 or on the leading side relative to the write point P3. Note that FIG. 16 shows in particular an example in which the peak write magnetic field point P1 is located on the leading side relative to the write point P3. When the write point P3 and the peak write magnetic field point P1 are in the first positional relationship, in a given region on the trailing side relative to the write point P3, the coercivity Hc increases whereas the write magnetic field strength Hh decreases as the distance from the write point P3 increases, so that the difference between the coercivity Hc and the write magnetic field strength Hh increases with increasing distance from the write point P3. In this case, no magnetization reversal will occur on the trailing side relative to the write point P3. In particular, when the peak write magnetic field point P1 is located on the leading side relative to the write point P3 as shown in FIG. 16, both dT/dx or the gradient of temperature T and dHh/dx or the gradient of write magnetic field strength Hh take on a negative value at the write point P3 as shown in FIG. 17. In this case, the absolute value of the effective magnetic field gradient dHeff/dx defined by Equation (1) above increases to enhance the linear recording density.

As shown in FIG. 18, the second positional relationship is such that the peak write magnetic field point P1 is located on the trailing side relative to the write point P3. When in the second positional relationship, as shown in FIG. 19, dT/dx or the gradient of temperature T takes on a negative value at the write point P3 whereas dHh/dx or the gradient of write magnetic field strength Hh takes on a positive value at the write point P3. In this case, in a region from the write point P3 to the peak write magnetic field point P1 which is located on the trailing side relative thereto, the coercivity Hc increases and the write magnetic field strength Hh also increases as the distance from the write point P3 increases. Thus, in the aforementioned region, the difference between the coercivity Hc and the write magnetic field strength Hh is small and therefore there is a possibility that magnetization reversal can occur due to variations in coercivity Hc or other factors. This may lead to the problems that the magnetization transition width increases to decrease the linear recording density, and erasure of data or erroneous writing may occur on the trailing side relative to the write point P3.

Thus, the write point P3 and the peak write magnetic field point P1 should preferably be in the first positional relationship shown in FIG. 16. If there is a large distance between the peak write magnetic field point P1 and the peak heat point P2, however, the write point P3 and the peak write magnetic field point P1 tend to be in the second positional relationship shown in FIG. 18. As can be seen from a comparison between FIG. 16 and FIG. 18, there is a larger distance between the peak write magnetic field point P1 and the peak heat point P2 in FIG. 18 than in FIG. 16, which is a contributing factor to bringing about the second positional relationship.

On the other hand, the enhancement of linear recording density is achievable by steepening the distribution of temperature T so as to increase the absolute value of dT/dx or the gradient of temperature T on the trailing side relative to the peak heat point P2 and thereby increase the absolute value of the effective magnetic field gradient dHeff/dx defined by Equation (1) above. However, increasing the absolute value of dT/dx or the gradient of temperature T on the trailing side relative to the peak heat point P2 would cause the write point P3 to be closer to the peak heat point P2. As a result, the write point P3 and the peak write magnetic field point P1 tend to be in the second positional relationship shown in FIG. 18.

In FIG. 18, the write point P3 and the peak write magnetic field point P1 can be brought into the first positional relationship if the distribution of the write magnetic field strength Hh and the peak write magnetic field point P1 are moved toward the leading side so as to reduce the distance between the peak write magnetic field point P1 and the peak heat point P2. Thus, the first positional relationship, which is preferable, can be readily achieved by reducing the distance between the peak write magnetic field point P1 and the peak heat point P2. However, restrictions on the arrangement of the magnetic pole 50 and the plasmon generator 40 would impose limitations on the reduction of the distance between the peak write magnetic field point P1 and the peak heat point P2 by bringing the magnetic pole 50 and the plasmon generator 40 closer to each other.

To resolve this problem, the present embodiment achieves a reduction in the distance between the peak write magnetic field point P1 and the peak heat point P2 by modifying the shape of the front end face 50a of the magnetic pole 50, not by bringing the magnetic pole 50 and the plasmon generator 40 closer to each other. More specifically, in the present embodiment, the front end face 50a of the magnetic pole 50 is configured to have the main portion 50M and the first and second extended portions 50E1 and 50E2. This allows the peak write magnetic field point P1 to move toward the leading side when compared with the case where the front end face 50a of the magnetic pole 50 has only the main portion 50M. Now, this will be described below referring to the results of a first simulation.

Figure 20:
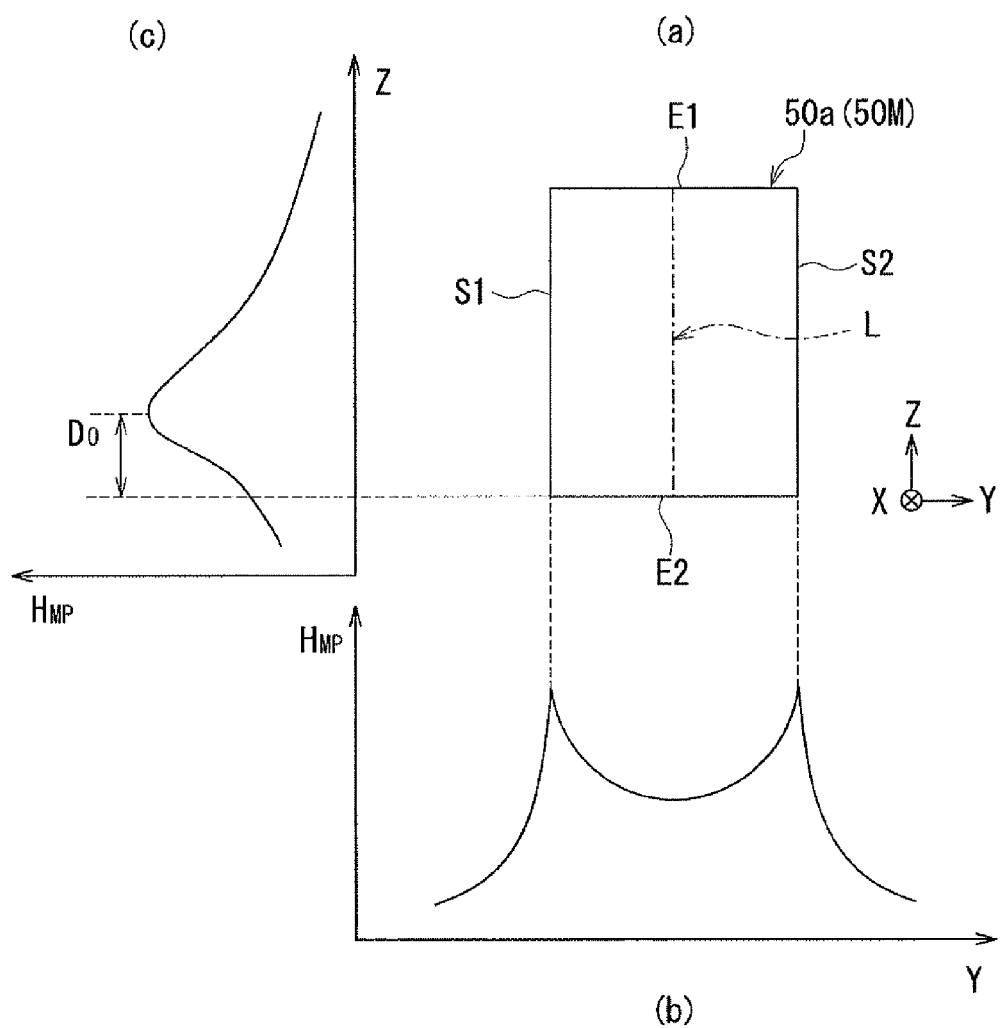
FIG. 20 is an explanatory diagram illustrating the results of a first simulation on a head of a comparative example.

The first simulation employs a head of a comparative example which is a thermally-assisted magnetic recording head in which the front end face 50a of the magnetic pole 50 has only the main portion 50M while the other components are configured in the same manner as in the present embodiment. In the first simulation, the distribution of the strength $H_{MP}$ of the magnetic field generated from the front end face 50a of the magnetic pole 50 was first investigated on the head of the comparative example. FIG. 20 is an explanatory diagram illustrating the results of the first simulation on the head of the comparative example. In FIG. 20, portion (a) shows the front end face 50a (the main portion 50M), portion (b) shows the distribution of the strength $H_{MP}$ of the magnetic field in the vicinity of the second end portion E2, and portion (c) shows the distribution of the strength $H_{MP}$ of the magnetic field on a virtual straight line L passing through the center of the second end portion E2 and extending in the Z direction.

In the arrangement in which the return yoke layer 28 having an end face located in the medium facing surface 12a is provided on the leading side of the magnetic pole 50 (see FIG. 8), the strength $H_{MP}$ of the magnetic field generated from the front end face 50a is greater in the vicinity of the second end portion E2 than in any other areas. In the head of the comparative example, magnetic flux saturation occurs in the vicinity of the second end portion E2 when the write current flowing through the coil 47 is increased. In the first simulation, investigated was the distribution of magnetic flux density when the magnetic flux was saturated or almost saturated in the vicinity of the second end portion E2 in the magnetic pole 50. The results showed that, in the vicinities of two corners on opposite sides of the second end portion E2, magnetic flux saturation occurred to increase the magnetic flux density, whereas at the center of the second end portion E2, the magnetic flux density was lower than in the vicinities of the two corners. Due to this phenomenon, as shown in portion (b) of FIG. 20, the strength $H_{MP}$ of the magnetic field generated from the vicinity of each of the two corners is greater whereas the strength $H_{MP}$ of the magnetic field generated from the center of the second end portion E2 is smaller than the strength $H_{MP}$ of the magnetic field generated from the vicinity of each of the two corners. Furthermore, when the distribution of the strength $H_{MP}$ of the magnetic field generated from the front end face 50a is viewed on the virtual straight line L, the strength $H_{MP}$ of the magnetic filed peaks at a position on the trailing side relative to the second end portion E2, as shown in portion (c) of FIG. 20. Thus, as shown in FIG. 16, the peak write magnetic field point P1 occurs on the trailing side relative to the second end portion E2 (the 0 μm position in FIG. 16).

Figure 21:
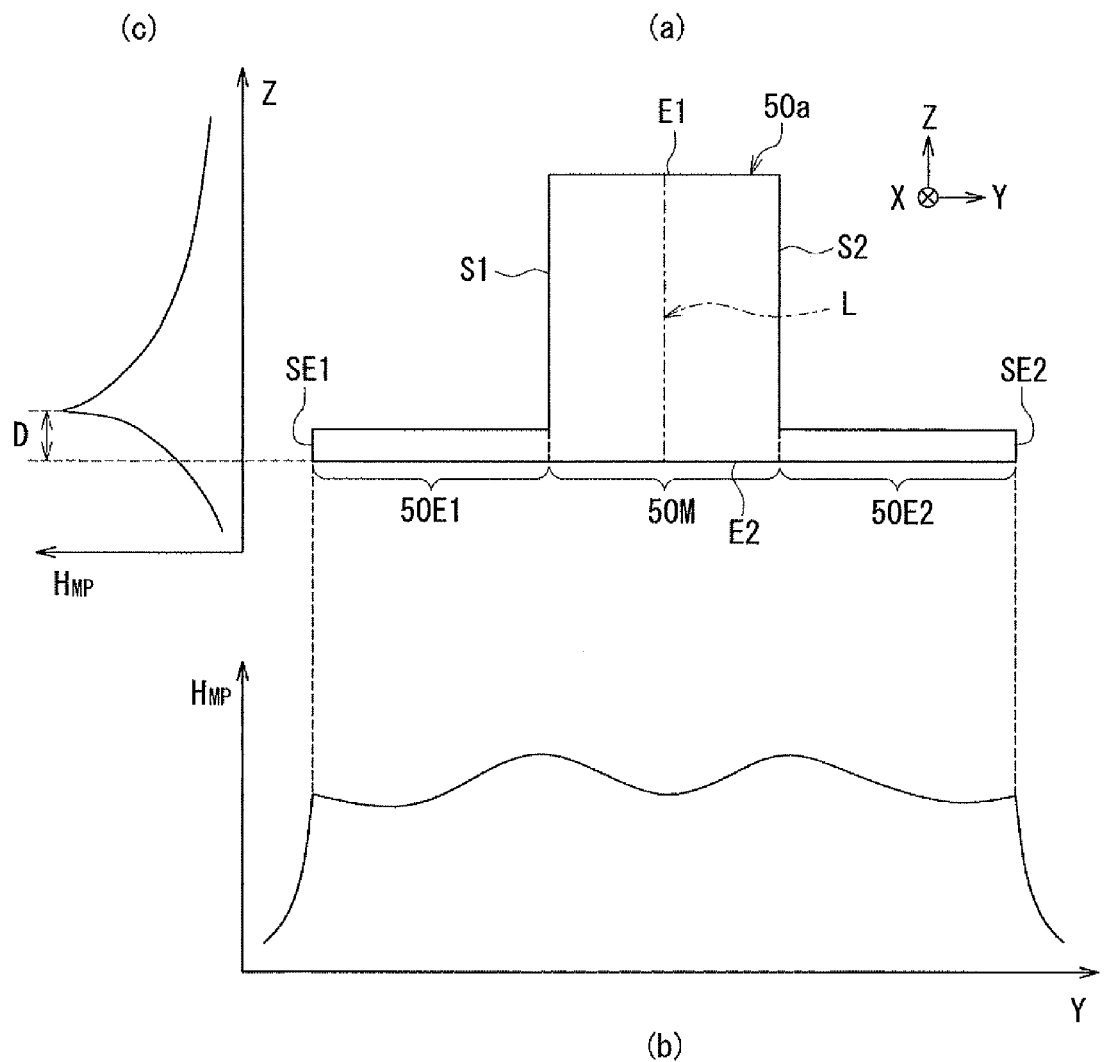
FIG. 21 is an explanatory diagram illustrating the results of the first simulation on the thermally-assisted magnetic recording head according to the first embodiment of the invention.

Then, in the first simulation, the distribution of the strength $H_{MP}$ of the magnetic field generated from the front end face 50a of the magnetic pole 50 was investigated on the thermally-assisted magnetic recording head 1 according to the present embodiment. FIG. 21 is an explanatory diagram illustrating the results of the first simulation on the thermally-assisted magnetic recording head 1 according to the present embodiment. In FIG. 21, portion (a) shows the front end face 50a, portion (b) shows the distribution of the strength $H_{MP}$ of the magnetic field in the vicinity of the second end portion E2, and portion (c) shows the distribution of the strength $H_{MP}$ of the magnetic field on the virtual straight line L passing through the center of the second end portion E2 and extending in the Z direction.

In the present embodiment, the front end face 50a of the magnetic pole 50 has the two extended portions 50E1 and 50E2 in addition to the main portion 50M. The first simulation showed that the magnetic pole 50 of the present embodiment serves to alleviate the local saturation of magnetic flux occurring in the vicinities of the two corners on opposite sides of the second end portion E2 in the comparative example, thereby allowing the magnetic flux density to be increased to some extent in a larger area in the front end face 50a of the magnetic pole 50. This is conceivably because of the fact that the first and second extended portions 50E1 and 50E2 increased the capacity for magnetic flux in the vicinity of the second end portion E2 as compared with the case of the absence of the extended portions 50E1 and 50E2. As shown in portion (b) of FIG. 21, this eliminated the phenomenon that the strength $H_{MP}$ of the magnetic field generated from the center of the second end portion E2 was significantly smaller than the strength $H_{MP}$ of the magnetic field generated from areas other than the center of the second end portion E2. Furthermore, as shown in portion (c) of FIG. 21, when the distribution of the strength $H_{MP}$ of the magnetic field generated from the front end face 50a is viewed on the virtual straight line L, the position of the peak value is closer to the second end portion E2 in the present embodiment than in the comparative example. Thus, in the present embodiment, the peak write magnetic field point P1 is moved toward the leading side when compared with the comparative example, although still located on the trailing side relative to the second end portion E2.

As described above, the first and second extended portions 50E1 and 50E2 have the function of increasing the capacity for magnetic flux in the vicinity of the second end portion E2 as compared with the case of the absence of the extended portions 50E1 and 50E2, thereby alleviating the local saturation of magnetic flux in the vicinity of the second end portion E2. To make full use of this function, the first and second extended portions 50E1 and 50E2 need to extend from the side portions S1 and S2 of the main portion 50M in the track width direction TW, at positions closer to the second end portion E2 relative to the center C of the main portion 50M, that is, on the leading side relative to the center C.

Here, as shown in portion (c) of FIG. 20, the distance between the second end portion E2 and the position of the peak value of the strength $H_{MP}$ of the magnetic field on the virtual straight line L in the comparative example will be represented by the symbol $D_0$. On the other hand, as shown in portion (c) of FIG. 21, the distance between the second end portion E2 and the position of the peak value of the strength $H_{MP}$ of the magnetic field on the virtual straight line. L in the present embodiment will be represented by the symbol D. The distance $D_0$ is about 12 nm, for example. The distance D is smaller than the distance $D_0$.

As described above, according to the present embodiment, the peak write magnetic field point P1 moves toward the leading side when compared with the comparative example. The present embodiment therefore allows the distance between the peak write magnetic field point P1 and the peak heat point P2 to be reduced beyond the limit resulting from the arrangement of the magnetic pole 50 and the plasmon generator 40. The first positional relationship, which is preferable, is thus readily achievable by the present embodiment. Consequently, according to the present embodiment, it is possible to reduce the magnetization transition width to enhance the linear recording density, and to prevent erasure of data or erroneous writing from occurring on the trailing side relative to the write point P3.

Now, a description will be given of the results of second to fourth simulations. The second simulation was conducted to determine the preferable range of PWB/PWA. The third and fourth simulations were conducted to determine the preferable range of the dimension in the Z direction $T_{MP2}$ of the first and second extended portions 50E1 and 50E2. The second to fourth simulations employed the finite element method to determine the distribution of the write magnetic field strength Hh on the center line of the track that was assumed to be at a position 14 nm distant from the medium facing surface 12a. Furthermore, from the distribution of the write magnetic field strength Hh, determined were the write magnetic field strength Hh at the peak write magnetic field point P1 (the peak value of the write magnetic field strength Hh) and the amount of shift SA related to the amount of movement of the peak write magnetic field point P1 from a reference position. The definition of the amount of shift SA will be described later. In the second to fourth simulations, the dimension in the Z direction (thickness) of the first layer 51 of the magnetic pole 50 in the medium facing surface 12a was assumed to be 0.7 μM1, and the length PWA of the first end portion E1 shown in FIG. 2 was assumed to be 150 nm.

In the second simulation, $T_{MP2}$ or the dimension in the Z direction (thickness) of the second layer 52 in the medium facing surface 12a was assumed to be 50 nm. The distance PWB shown in FIG. 2 was varied within the range of 150 to 3000 nm. The write current flowing through the coil 47 was set at 50 mA.

In the second simulation, the case of 150 nm PWB is where the front end face 50a has only the main portion 50M, that is, the case of the comparative example which has been described with reference to FIG. 20. In the second simulation, assuming the peak write magnetic field point P1 at 150 nm PWB as the reference position, the amount of shift SA related to the amount of movement of the peak write magnetic field point P1 from the reference position was defined as follows. First, the distance between the peak write magnetic field point P1 at 150 nm PWB and a position on the track corresponding to the second end portion E2 was assumed to be $D_0$, and the distance between the peak write magnetic field point P1 at any value of PWB other than 150 nm and the position on the track corresponding to the second end portion E2 was assumed to be D. Then, the amount of shift SA (in %) was defined by Equation (2) below.

$$SA=(D_0-D)/D_0\times 100 \quad (2)$$

In the third simulation, PWB was assumed to be 500 nm. The dimension in the Z direction (thickness) of the second layer 52 in the medium facing surface 12a was varied within the range of 0 to 250 nm to vary $T_{MP2}$ within the range of 0 to 250 nm. The write current flowing through the coil 47 was set at 50 mA.

In the fourth simulation, PWB was assumed to be 500 nm. $T_{MP2}$ was assumed to be 50 nm or 100 nm. The write current flowing through the coil 47 was set at 65 mA.

In the third simulation, the case of 0 nm $T_{MP2}$ is where the front end face 50a has only the main portion 50M, that is, the case of the comparative example which has been described with reference to FIG. 20. In the third and fourth simulations, assuming the peak write magnetic field point P1 at 0 nm $T_{MP2}$ as the reference position, the amount of shift SA related to the amount of movement of the peak write magnetic field point P1 from the reference position was defined as follows. First, the distance between the peak write magnetic field point P1 at 0 nm $T_{MP2}$ and a position on the track corresponding to the second end portion E2 was assumed to be $D_0$, and the distance between the peak write magnetic field point P1 at any value of $T_{MP2}$ other than 0 nm and the position on the track corresponding to the second end portion E2 was assumed to be D. Then, the amount of shift SA (in %) was defined by Equation (2) above.

Figure 22:
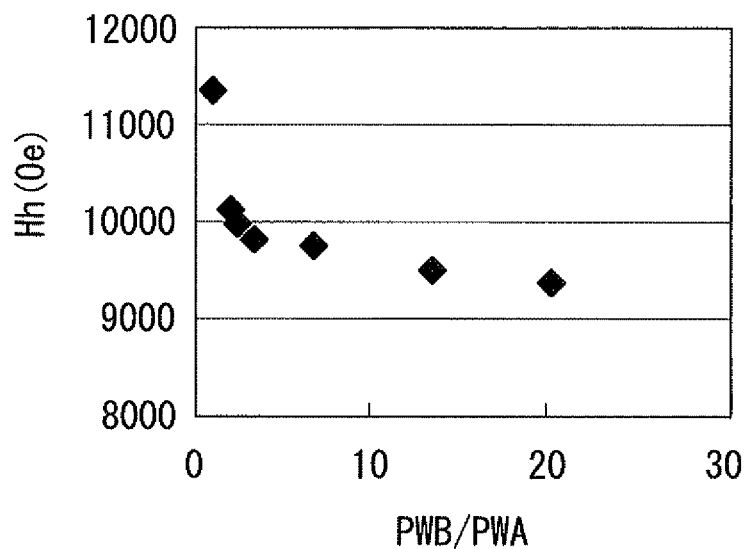
FIG. 22 is a characteristic diagram showing the write magnetic field strength at the peak write magnetic field point determined by a second simulation.
Figure 23:
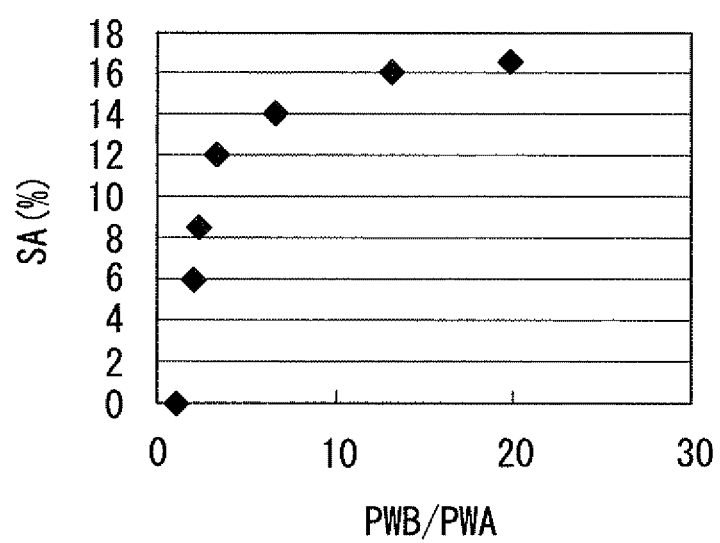
FIG. 23 is a characteristic diagram showing the amount of shift determined by the second simulation.

The results of the second simulation are shown in FIG. 22, FIG. 23, and Table 1. FIG. 22 is a characteristic diagram showing the write magnetic field strength Hh at the peak write magnetic field point P1. FIG. 23 is a characteristic diagram showing the amount of shift SA. In FIG. 22, the horizontal axis represents PWB/PWA, while the vertical axis represents the write magnetic field strength Hh (in Oe) at the peak write magnetic field point P1. In FIG. 23, the horizontal axis represents PWB/PWA, while the vertical axis represents the amount of shift SA (in %). Note that the amount of shift SA in Table 1 is shown with values rounded off to the nearest integer.

TABLE 1

| PWB (nm) | PWB/PWA | SA (%) | Hh (Oe) |
|---|---|---|---|
| 150 | 1 | 0 | 11352 |
| 300 | 2 | 6 | 10124 |
| 350 | 2.3 | 9 | 9987 |
| 500 | 3.3 | 12 | 9812 |
| 1000 | 6.7 | 14 | 9752 |
| 2000 | 13.3 | 16 | 9523 |
| 3000 | 20 | 17 | 9375 |

The results of the second simulation show that the amount of shift SA increases as PWB/PWA increases. When PWB/PWA is 2.3 or greater, the amount of shift SA is about 10% or greater, so that the peak write magnetic field point P1 greatly moves toward the leading side when compared with the comparative example. Furthermore, when PWB/PWA is 3.3 or greater, the amount of shift SA is particularly increased (to 12% or greater). On the other hand, the amount of shift SA is thought to be saturated when PWB/PWA reaches 20. If PWB/PWA exceeds 20, there can occur a phenomenon that when a signal is being written on a certain track, signals that have been stored on one or more tracks adjacent to the track targeted for writing are erased or attenuated. In view of the foregoing, PWB/PWA is preferably in the range of 2.3 to 20, and more preferably in the range of 3.3 to 20. This may be rephrased as follows in relation to the language of the claims of the present application. That is, the distance PWB between the first side end SE1 and the second side end SE2 in the track width direction TW is preferably in the range of 2.3 to 20 times the length PWA of the first end portion E1 and more preferably in the range of 3.3 to 20 times the length PWA. Note that increasing PWB/PWA causes the write magnetic field strength Hh at the peak write magnetic field point P1 to decrease; however, the write magnetic field strength Hh can be increased by increasing the write current flowing through the coil 47.

Figure 24:
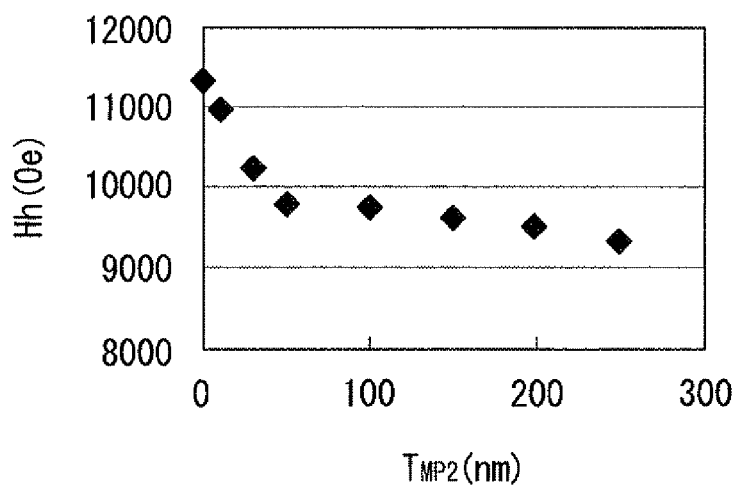
FIG. 24 is a characteristic diagram showing the write magnetic field strength at the peak write magnetic field point determined by a third simulation.
Figure 25:
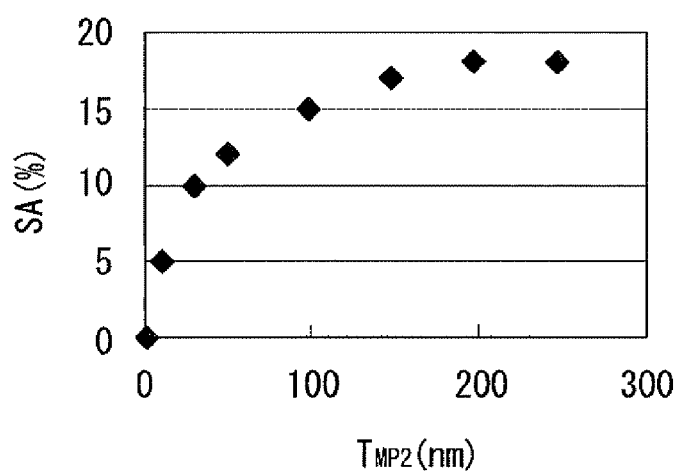
FIG. 25 is a characteristic diagram showing the amount of shift determined by the third simulation.

The results of the third simulation are shown in FIG. 24, FIG. 25, and Table 2. FIG. 24 is a characteristic diagram showing the write magnetic field strength Hh at the peak write magnetic field point P1. FIG. 25 is a characteristic diagram showing the amount of shift SA. In FIG. 24, the horizontal axis represents $T_{MP2}$ (in nm), while the vertical axis represents the write magnetic field strength Hh (in Oe) at the peak write magnetic field point P1. In FIG. 25, the horizontal axis represents $T_{MP2}$ (in nm), while the vertical axis represents the amount of shift SA (in %). Note that the amount of shift SA in Table 2 is shown with values rounded off to the nearest integer.

TABLE 2

| $T_{MP2}$ (nm) | SA (%) | Hh (Oe) |
|---|---|---|
| 0 | 0 | 11352 |
| 10 | 5 | 10983 |
| 30 | 10 | 10265 |
| 50 | 12 | 9812 |
| 100 | 15 | 9789 |
| 150 | 17 | 9654 |
| 200 | 18 | 9545 |
| 250 | 18 | 9373 |

The results of the third simulation show that the amount of shift SA increases as $T_{MP2}$ increases. Note that the case of 50 nm $T_{MP2}$ in the third simulation is the same as the case of 500 nm PWB in the second simulation. When $T_{MP2}$ falls within the range of 30 to 250 nm, the amount of shift SA is about 10% or greater, so that the peak write magnetic field point P1 greatly moves toward the leading side when compared with the comparative example. When $T_{MP2}$ is 100 nm or greater, the amount of shift SA is particularly increased (to 15% or greater). On the other hand, the amount of shift SA is thought to be saturated when $T_{MP2}$ reaches 200 nm. In view of the foregoing, $T_{MP2}$ is preferably in the range of 30 to 250 nm, and more preferably in the range of 100 to 200 nm. Note that increasing $T_{MP2}$ causes the write magnetic field strength Hh at the peak write magnetic field point P1 to decrease; however, the write magnetic field strength Hh can be increased by increasing the write current flowing through the coil 47.

The results of the fourth simulation are shown in Table 3. The results of the fourth simulation show that the peak write magnetic field point P1 can be moved toward the leading side when compared with the comparative example and the amount of shift SA can be increased by increasing $T_{MP2}$ even when the write magnetic field strength Hh is increased by increasing the write current flowing through the coil 47 as compared with the third simulation.

TABLE 3

| $T_{MP2}$ (nm) | SA (%) | Hh (Oe) |
|---|---|---|
| 50 | 7 | 11502 |
| 100 | 12 | 9802 |

The write magnetic field strength Hh at the peak write magnetic field point P1 in the case of 0 nm $T_{MP2}$ in the third simulation, that is, in the case of the comparative example, is nearly equal to the write magnetic field strength Hh at the peak write magnetic field point P1 in the case of 50 nm $T_{MP2}$ in the fourth simulation. In the latter case, the peak write magnetic field point P1 is moved toward the leading side when compared with the former case (the comparative example). This shows that even if comparison is made by employing generally the same magnitudes of write magnetic field strength Hh at the peak write magnetic field point P1, the present embodiment is capable of moving the peak write magnetic field point P1 toward the leading side when compared with the comparative example.

The other effects provided by the present embodiment will now be described. The plasmon generator 40 of the present embodiment includes the base part 41 and the protruding part 42. Of these parts, it is the protruding part 42 that mainly contributes to the excitation of surface plasmons. Heat is therefore generated at the protruding part 42. More specifically, a greater amount of heat is generated in an area of the protruding part 42 near the flat surface 42b. The base part 41 is contiguous with the protruding part 42 and extends in the Y direction more than the protruding part 42 does. Accordingly, the base part 41 functions as a heat sink for dissipating the heat generated at the protruding part 42 outward from the plasmon generator 40. According to the present embodiment, it is thus possible to suppress an increase in temperature of the plasmon generator 40.

The magnetic pole 50 of the present embodiment includes the first layer 51 and the second layer 52. The second layer 52 is in contact with the base part 41 and extends in the Y direction more than the protruding part 42 does. Accordingly, the second layer 52 also functions as a heat sink for dissipating the heat generated at the protruding part 42 outward from the plasmon generator 40. The present embodiment thus makes it possible to suppress an increase in temperature of the plasmon generator 40.

Second Embodiment

Figure 26:
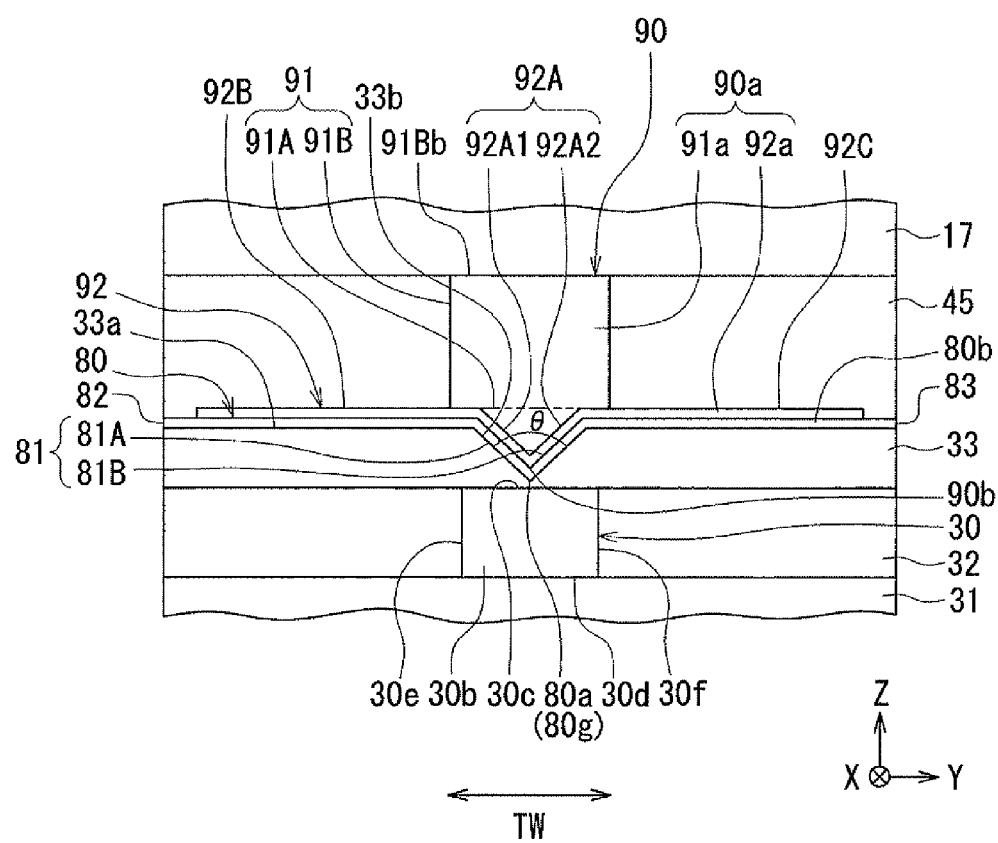
FIG. 26 is a front view showing the main part of a thermally-assisted magnetic recording head according to a second embodiment of the invention.
Figure 28:
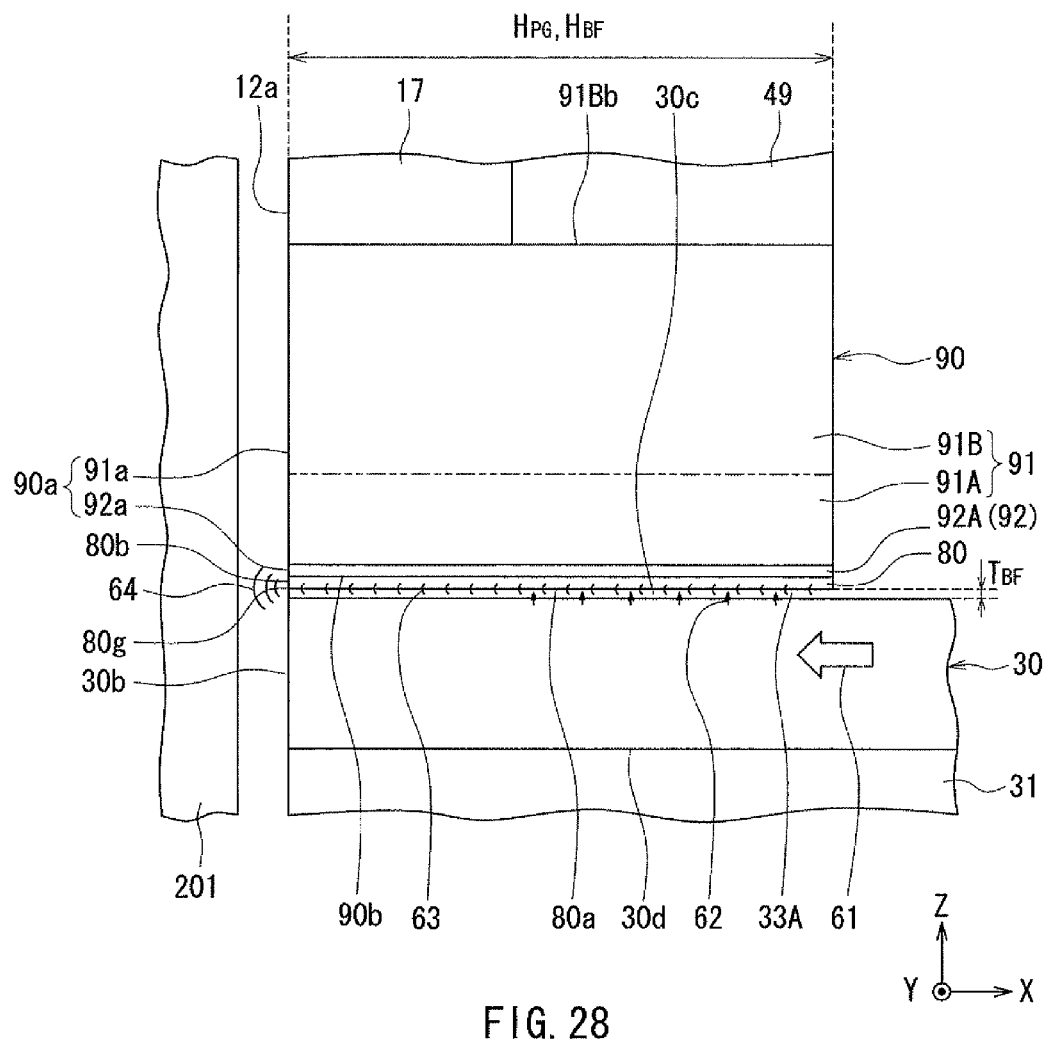
FIG. 28 is a cross-sectional view showing the main part of the thermally-assisted magnetic recording head according to the second embodiment of the invention.
Figure 29:
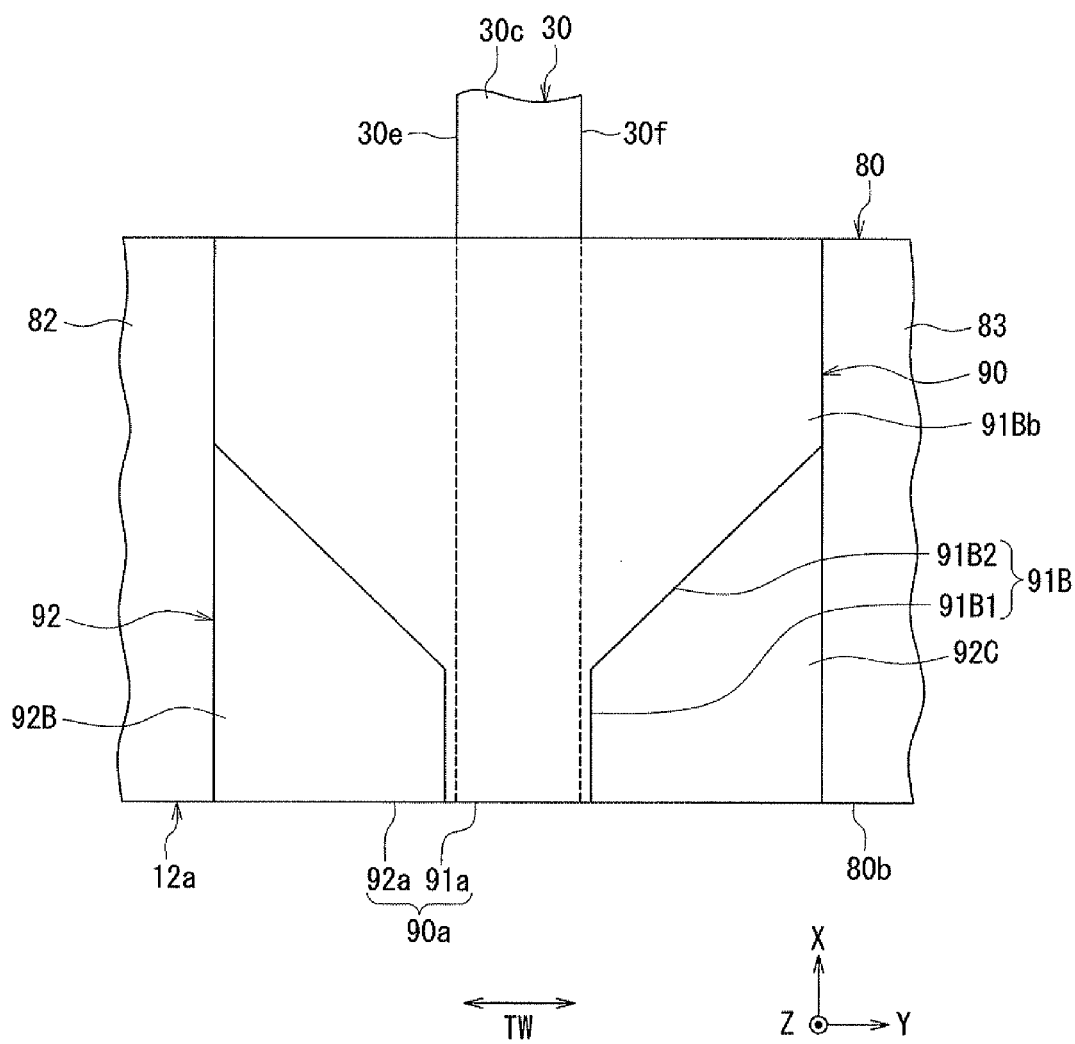
FIG. 29 is a plan view showing the main part of the thermally-assisted magnetic recording head according to the second embodiment of the invention.

A second embodiment of the present invention will now be described. First, reference is made to FIG. 26, FIG. 28, and FIG. 29 to describe the configuration of the thermally-assisted magnetic recording head 1 according to the present embodiment. FIG. 26 is a front view showing the main part of the thermally-assisted magnetic recording head 1. FIG. 26 shows part of the medium facing surface 12a. FIG. 28 is a cross-sectional view showing the main part of the thermally-assisted magnetic recording head 1. FIG. 28 shows a cross section perpendicular to the element-forming surface 11c (see FIG. 7 and FIG. 8) and the medium facing surface 12a. FIG. 29 is a plan view showing the main part of the thermally-assisted magnetic recording head 1.

The thermally-assisted magnetic recording head 1 according to the present embodiment has a plasmon generator 80 and a magnetic pole 90, instead of the plasmon generator 40 and the magnetic pole 50 of the first embodiment. The thermally-assisted magnetic recording head 1 according to the present embodiment does not have the dielectric layer 34.

As in the first embodiment, the cladding layer 33 has a top surface 33a and a groove 33b. In the present embodiment, the groove 33b is V-shaped in cross section parallel to the medium facing surface 12a.

As shown in FIG. 26, FIG. 28, and FIG. 29, the plasmon generator 80 includes a plasmon exciting part 80a and a front end face 80b. The plasmon exciting part 80a faces the evanescent light generating surface 30c of the core 30 with a predetermined spacing therebetween. The front end face 80b is located in the medium facing surface 12a. Surface plasmons are excited on the plasmon exciting part 80a through coupling with the evanescent light generated from the evanescent light generating surface 30c. As shown in FIG. 28, the cladding layer 33 has a portion interposed between the evanescent light generating surface 30c and the plasmon exciting part 80a, and this portion of the cladding layer 33 forms a buffer part 33A that has a refractive index lower than that of the core 30.

As shown in FIG. 26, the plasmon generator 80 has a V-shaped portion 81 including part of the front end face 80b and the plasmon exciting part 80a. The V-shaped portion 81 extends in the direction perpendicular to the medium facing surface 12a (the X direction). The groove 33b mentioned above is provided to accommodate the V-shaped portion 81.

The V-shaped portion 81 has a first sidewall portion 81A and a second sidewall portion 81B that are each connected to the plasmon exciting part 80a and that increase in distance from each other with increasing distance from the plasmon exciting part 80a. The first and second sidewall portions 81A and 81B are each shaped like a plate. The first and second sidewall portions 81A and 81B are connected to each other so that the connected first and second sidewall portions 81A and 81B have a V-shaped cross section parallel to the medium facing surface 12a. The plasmon exciting part 80a is formed of an edge of the connected first and second sidewall portions 81A and 81B, the edge being located at an end closest to the evanescent light generating surface 30c.

The plasmon generator 80 further has an extended portion 82 that is connected to an end of the first sidewall portion 81A opposite from the plasmon exciting part 80a, and an extended portion 83 that is connected to an end of the second sidewall portion 81B opposite from the plasmon exciting part 80a. From the end of the first sidewall portion 81A opposite from the plasmon exciting part 80a, the extended portion 82 extends parallel to the evanescent light generating surface 30c and away from both the first and second sidewall portions 81A and 81B (in the −Y direction). From the end of the second sidewall portion 81B opposite from the plasmon exciting part 80a, the extended portion 83 extends parallel to the evanescent light generating surface 30c and away from both the first and second sidewall portions 81A and 81B (in the Y direction).

The front end face 80b has a near-field light generating part 80g located at an end of the plasmon exciting part 80a. The near-field light generating part 80g generates near-field light based on the surface plasmons excited on the plasmon exciting part 80a.

As shown in FIG. 28, the length of the plasmon generator 80 in the X direction will be represented by the symbol $H_{PG}$, and the length of a portion of the plasmon exciting part 80a in the X direction, the portion being opposed to the evanescent light generating surface 30c, will be represented by the symbol $H_{BF}$. $H_{PG}$ and $H_{BF}$ both fall within the range of 0.6 to 4.0 µm, for example. In the example shown in FIG. 28, the front end face 30b of the core 30 is located in the medium facing surface 12a, so that $H_{BF}$ is equal to $H_{PG}$. The distance between the plasmon exciting part 80a and the evanescent light generating surface 30c will be represented by the symbol $T_{BF}$. $T_{BF}$ falls within the range of 10 to 100 nm, for example. The distance between the near-field light generating part 80g of the front end face 80b of the plasmon generator 80 and the front end face 30b of the core 30 is equal to $T_{BF}$.

The dimension of the V-shaped portion 81 of the plasmon generator 80 in the direction perpendicular to the evanescent light generating surface 30c (the Z direction) and that in the track width direction TW (the Y direction) are both sufficiently smaller than the wavelength of the laser light to propagate through the core 30. An angle θ (see FIG. 26) within the range of 30 to 120 degrees, for example, is formed between the two surfaces of the V-shaped portion 81 that are located on opposite sides in the track width direction TW.

In the medium facing surface 12a, the plasmon generator 80 has a dimension of, for example, 0.1 to 20 µm in the track width direction TW (the Y direction). The dimension of the plasmon generator 80 in the track width direction TW (the Y direction) may be constant regardless of the distance from the medium facing surface 12a, or may become greater at positions away from the medium facing surface 12a than in the medium facing surface 12a.

The magnetic pole 90 has a front end face 90a located in the medium facing surface 12a, and an edge part 90b which is a bottom end. The magnetic pole 90 includes a first layer 91 constituting most part of the volume of the magnetic pole 90 and a second layer 92 located between the first layer 91 and the plasmon generator 80. The second layer 92 has an end face 92a located in the medium facing surface 12a.

The second layer 92 has a V-shaped portion 92A including part of the end face 92a and the edge part 90b. The V-shaped portion 92A extends in the direction perpendicular to the medium facing surface 12a (the X direction). The V-shaped portion 92A is in contact with the V-shaped portion 81 of the plasmon generator 80.

The V-shaped portion 92A is of the same shape as the V-shaped portion 81 of the plasmon generator 80. More specifically, the V-shaped portion 92A has a first sidewall portion 92A1 and a second sidewall portion 92A2 that are each connected to the edge part 90b and that increase in distance from each other with increasing distance from the edge part 90b. The first and second sidewall portions 92A1 and 92A2 are each shaped like a plate. The first and second sidewall portions 92A1 and 92A2 are in contact with the first and second sidewall portions 81A and 81B of the plasmon generator 80, respectively, and are connected to each other so that the connected first and second sidewall portions 92A1 and 92A2 have a V-shaped cross section parallel to the medium facing surface 12a. The edge part 90b is formed of an edge of the connected first and second sidewall portions 92A1 and 92A2, the edge being located at an end closest to the evanescent light generating surface 30c.

The second layer 92 further has an extended portion 92B that is connected to an end of the first sidewall portion 92A1 opposite from the edge part 90b, and an extended portion 92C that is connected to an end of the second sidewall portion 92A2 opposite from the edge part 90b. From the end of the first sidewall portion 92A1 opposite from the edge part 90b, the extended portion 92B extends parallel to the evanescent light generating surface 30c and away from both the first and second sidewall portions 92A1 and 92A2 (in the −Y direction). From the end of the second sidewall portion 92A2 opposite from the edge part 90b, the extended portion 92C extends parallel to the evanescent light generating surface 30c and away from both the first and second sidewall portions 92A1 and 92A2 (in the Y direction). In the vicinity of the medium facing surface 12a, as shown in FIG. 29, the outer edges of the extended portions 92B and 92C lie outside the outer edges of the first layer 91 as viewed from above. The outer edges of the extended portions 82 and 83 of the plasmon generator 80 may lie outside or inside the outer edges of the extended portions 92B and 92C of the magnetic pole 90 as viewed from above. In the example shown in FIG. 29, the outer edges of the extended portions 82 and 83 lie outside the outer edges of the extended portions 92B and 92C.

The first layer 91 has an end face 91a located in the medium facing surface 12a. The first layer 91 includes a first portion 91A and a second portion 91B. The first portion 91A is accommodated in the space defined by the V-shaped portion 92A (the first and second sidewall portions 92A1 and 92A2) of the second layer 92. The second portion 91B is located farther from the evanescent light generating surface 30c of the core 30 than is the first portion 91A. In FIG. 26 and FIG. 28, the boundary between the first portion 91A and the second portion 91B is shown by a chain double-dashed line.

The first portion 91A is in the shape of a triangular prism. The first portion 91A is sandwiched between and in contact with the first and second sidewall portions 92A1 and 92A2 of the V-shaped portion 92A of the second layer 92. The width of the first portion 91A in the direction parallel to the medium facing surface 12a and the evanescent light generating surface 30c (the Y direction) is constant or almost constant regardless of the distance from the medium facing surface 12a.

As shown in FIG. 26 and FIG. 28, the second portion 91B has a top surface 91Bb. As shown in FIG. 29, the second portion 91B includes a track width defining portion 91B1 and a wide portion 91B2. The track width defining portion 91B1 has a first end located in the medium facing surface 12a and a second end opposite to the first end. The wide portion 91B2 is connected to the second end of the track width defining portion 91B1. The shapes of the track width defining portion 91B1 and the wide portion 91B2 are the same as those of the track width defining portion 511 and the wide portion 512 of the first embodiment. In the present embodiment, the track width defining portion 91B1 is greater than the first portion 91A in width in the direction parallel to the medium facing surface 12a and the evanescent light generating surface 30c (the Y direction). The track width defining portion 91B1 and the wide portion 91B2 are in contact with the extended portions 92B and 92C of the second layer 92.

Figure 27:
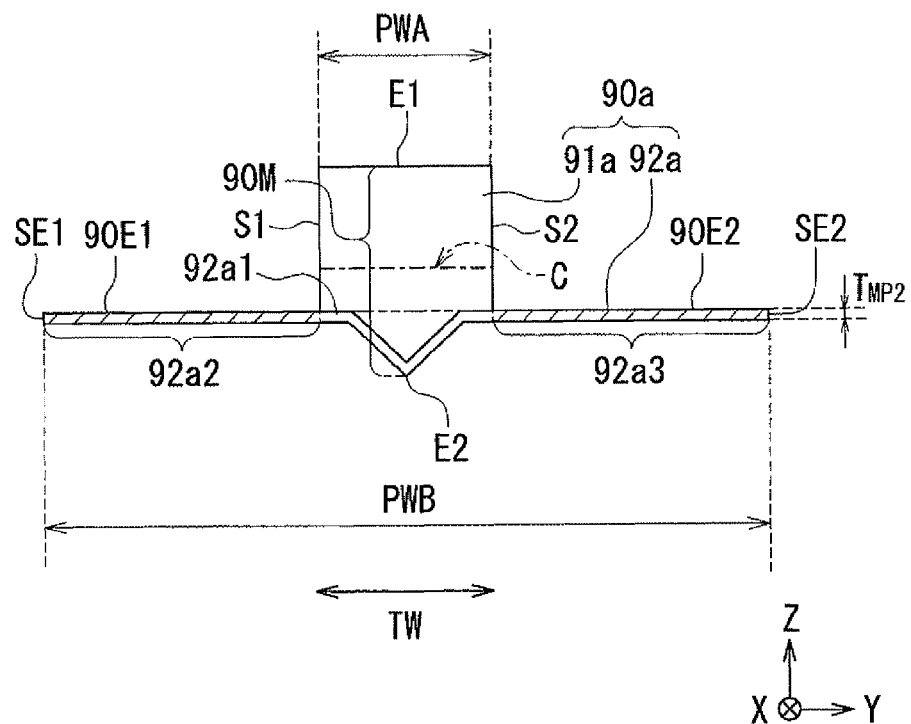
FIG. 27 is a front view showing the front end face of the magnetic pole of the second embodiment of the invention.

The front end face 90a of the magnetic pole 90 will now be described in more detail with reference to FIG. 27. FIG. 27 is a front view showing the front end face 90a of the magnetic pole 90. The front end face 90a of the magnetic pole 90 is composed of the end face 91a of the first layer 91 and the end face 92a of the second layer 92. The end face 92a of the second layer 92 includes a first portion 92a1 that is located directly below the end face 91a of the first layer 91, and a second portion 92a2 and a third portion 92a3 that are located on opposite sides of the first portion 92a1 in the track width direction TW. In FIG. 27, the boundary between the first portion 92a1 and the second portion 92a2 and the boundary between the first portion 92a1 and the third portion 92a3 are shown by broken lines. The first portion 92a1 is composed of the end face of the V-shaped portion 92A located in the medium facing surface 12a and a part of the end face of each of the extended portions 92B and 92C located in the medium facing surface 12a. The second portion 92a2 is composed of another part of the end face of the extended portion 92B located in the medium facing surface 92B. The third portion 92a3 is composed of another part of the end face of the extended portion 92C located in the medium facing surface 12a.

The front end face 90a of the magnetic pole 90 has a main portion 90M, a first extended portion 90E1, and a second extended portion 90E2. In FIG. 27, the extended portions 90E1 and 90E2 are hatched in order to illustrate the main portion 90M and the extended portions 90E1 and 90E2 with higher clarity. The main portion 90M is composed of the end face 91a of the first layer 91 and the first portion 92a1 of the end face 92a of the second layer 92. The first extended portion 90E1 is composed of the second portion 92a2 of the end face 92a of the second layer 92. The second extended portion 90E2 is composed of the third portion 92a3 of the end face 92a of the second layer 92.

The main portion 90M has: a first end portion E1 located on the trailing side and having a length PWA in the track width direction TW; a second end portion E2 located on the leading side; and a first side portion S1 and a second side portion S2 opposite to each other in the track width direction TW. The first side portion S1 includes the boundary between the main portion 90M and the first extended portion 90E1. The second side portion S2 includes the boundary between the main portion 90M and the second extended portion 90E2. The first end portion E1 lies at an end of the top surface 91Bb. The second end portion E2 is a point located at an end of the edge part 90b. The first extended portion 90E1 is extended in the track width direction TW from a part of the first side portion S1, the part of the first side portion S1 being located on the leading side relative to the center C of the main portion 90M in the direction of travel of the magnetic disk 201 (Z direction). The second extended portion 90E2 is extended in the track width direction TW from a part of the second side portion S2, the part of the second side portion S2 being located on the leading side relative to the aforementioned center C. In the present embodiment, in particular, the first extended portion 90E1 and the second extended portion 90E2 are located on the trailing side relative to the second end portion E2 of the main portion 90M.

The first extended portion 90E1 has a first side end SE1 located farthest from the first side portion S1. The second extended portion 90E2 has a second side end SE2 located farthest from the second side portion S2. As shown in FIG. 27, the distance between the first side end SE1 and the second side end SE2 in the track width direction TW will be represented by the symbol PWB. As in the first embodiment, PWB is preferably in the range of 2.3 to 20 times PWA, and more preferably in the range of 3.3 to 20 times PWA.

As shown in FIG. 27, the dimension of each of the first and second extended portions 90E1 and 90E2 in the direction of travel of the magnetic disk 201 (the Z direction) will be represented by the symbol $T_{MP2}$. In the present embodiment, $T_{MP2}$ is equal to the dimension in the Z direction (thickness) of each of the extended portions 92B and 92C of the second layer 92 in the medium facing surface 12a. As in the first embodiment, $T_{MP2}$ is preferably in the range of 30 to 250 nm, and more preferably in the range of 100 to 200 nm.

The principle of generation of near-field light in the present embodiment will now be described with reference to FIG. 28. The principle of generation of near-field light in the present embodiment is basically the same as that in the first embodiment. In the present embodiment, surface plasmons 63 are excited on the plasmon exciting part 80a of the plasmon generator 80 through coupling with evanescent light 62 generated from the evanescent light generating surface 30c. The surface plasmons 63 propagate along the plasmon exciting part 80a to the near-field light generating part 80g. Consequently, the surface plasmons 63 concentrate at the near-field light generating part 80g, and the near-field light generating part 80g generates near-field light 64 based on the surface plasmons 63.

Reference is now made to FIG. 30 to FIG. 35 to describe the step of forming the plasmon generator 80 and the step of forming the magnetic pole 90. FIG. 30 to FIG. 35 are cross-sectional views each showing part of a stack of layers formed in the process of manufacturing the thermally-assisted magnetic recording head 1. FIG. 30 to FIG. 35 each show a cross section taken in the position where the medium facing surface 12a is to be formed.

Figure 30:
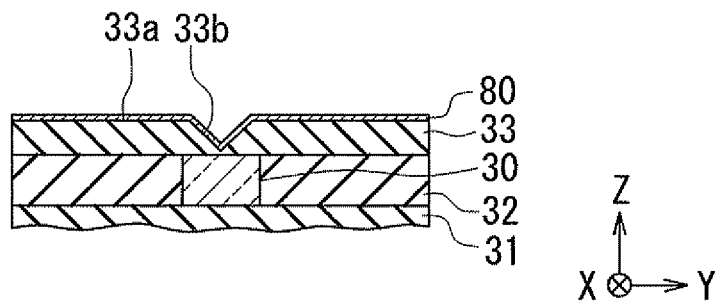
FIG. 30 is a cross-sectional view showing a step of a method of manufacturing the thermally-assisted magnetic recording head according to the second embodiment of the invention.

FIG. 30 shows the step of forming the plasmon generator 80. Here, an example of methods of forming the plasmon generator 80 will be described. In this method, the core 30 and the cladding layer 32 are first formed and then the cladding layer 33 is formed thereon. An etching mask is then formed on the cladding layer 33. The etching mask has an opening shaped to correspond to the planar shape of the V-shaped portion 81 of the plasmon generator 80 to be formed later. The cladding layer 33 is then taper-etched by, for example, reactive ion etching using the etching mask to thereby form the groove 33b in the cladding layer 33. The etching mask is then removed.

Next, a metal film that is to later become the plasmon generator 80 is formed to extend along the top surface 33a and the groove 33b of the cladding layer 33 by sputtering, for example. The metal film is then partially etched by, for example, ion milling, and thereby patterned. This makes the metal film into the plasmon generator 80.

Figure 31:
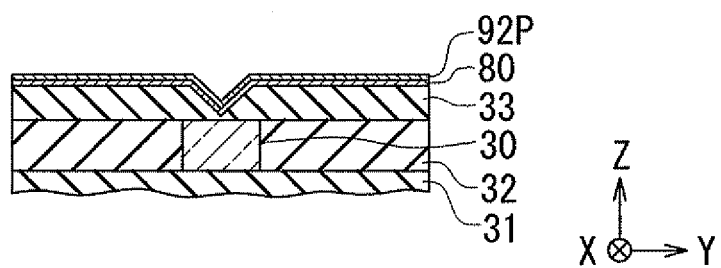
FIG. 31 is a cross-sectional view showing a step that follows the step shown in FIG. 30.

FIG. 31 shows the next step. In this step, a seed layer 92P made of a magnetic material is formed over the entire top surface of the stack. The seed layer 92P is to be partially etched later into the second layer 92 of the magnetic pole 90.

Figure 32:
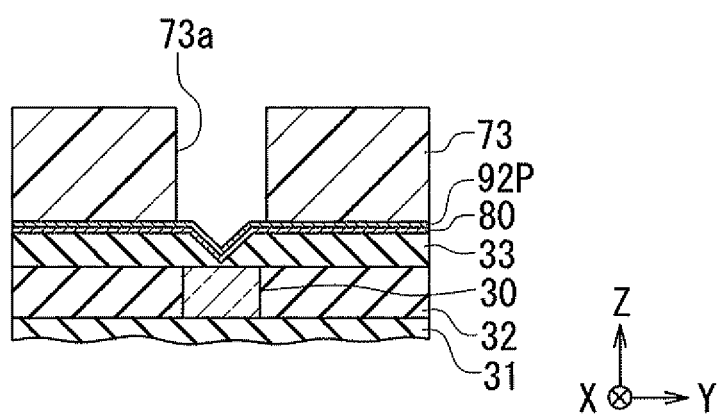
FIG. 32 is a cross-sectional view showing a step that follows the step shown in FIG. 31.

FIG. 32 shows the next step. In this step, a frame 73 for forming the first layer 91 of the magnetic pole 90 is formed on the seed layer 92P. The frame 73 is formed by patterning a photoresist layer by photolithography. The frame 73 has an opening 73a in the area where the first layer 91 of the magnetic pole 90 is to be formed.

Figure 33:
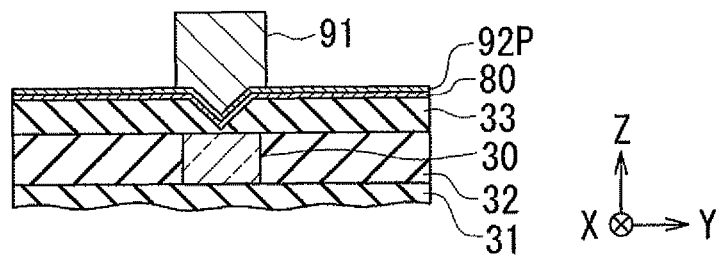
FIG. 33 is a cross-sectional view showing a step that follows the step shown in FIG. 32.

FIG. 33 shows the next step. In this step, first, a plating layer made of a magnetic material, that is, the first layer 91 of the magnetic pole 90, is formed in the opening 73a of the frame 73 by frame plating using the seed layer 92P as an electrode and a seed. The frame 73 is then removed.

Figure 34:
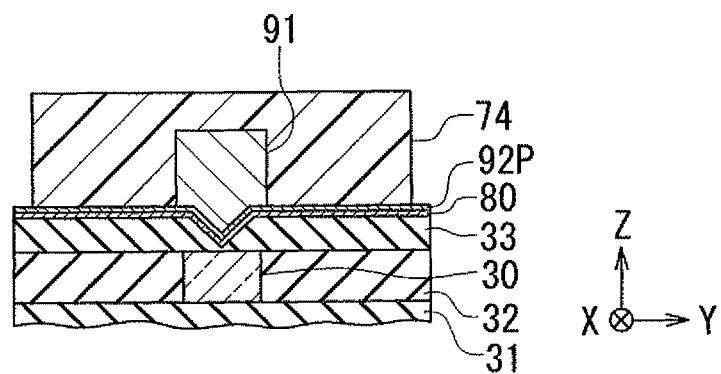
FIG. 34 is a cross-sectional view showing a step that follows the step shown in FIG. 33.

FIG. 34 shows the next step. In this step, a photoresist mask 74 for patterning the seed layer 92P is formed. The photoresist mask 74 is formed by patterning a photoresist layer by photolithography. The photoresist mask 74 covers the first layer 91 of the magnetic pole 90 and part of the seed layer 92P.

Figure 35:
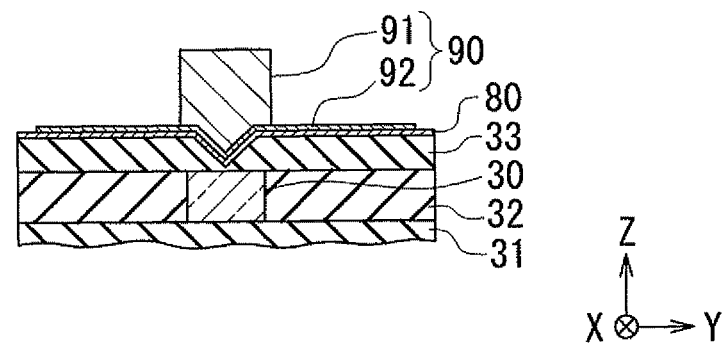
FIG. 35 is a cross-sectional view showing a step that follows the step shown in FIG. 34.

FIG. 35 shows the next step. In this step, first, the seed layer 92P except a portion thereof lying under the photoresist mask 74 and the magnetic pole 90 is etched by, for example, ion milling, using the photoresist mask 74 as the etching mask. This makes the seed layer 92P into the second layer 92 of the magnetic pole 90. The photoresist mask 74 is then removed. The magnetic pole 90 is completed through the series of steps described above.

The remainder of configuration, function and effects of the present embodiment are similar to those of the first embodiment.

Third Embodiment

Figure 36:
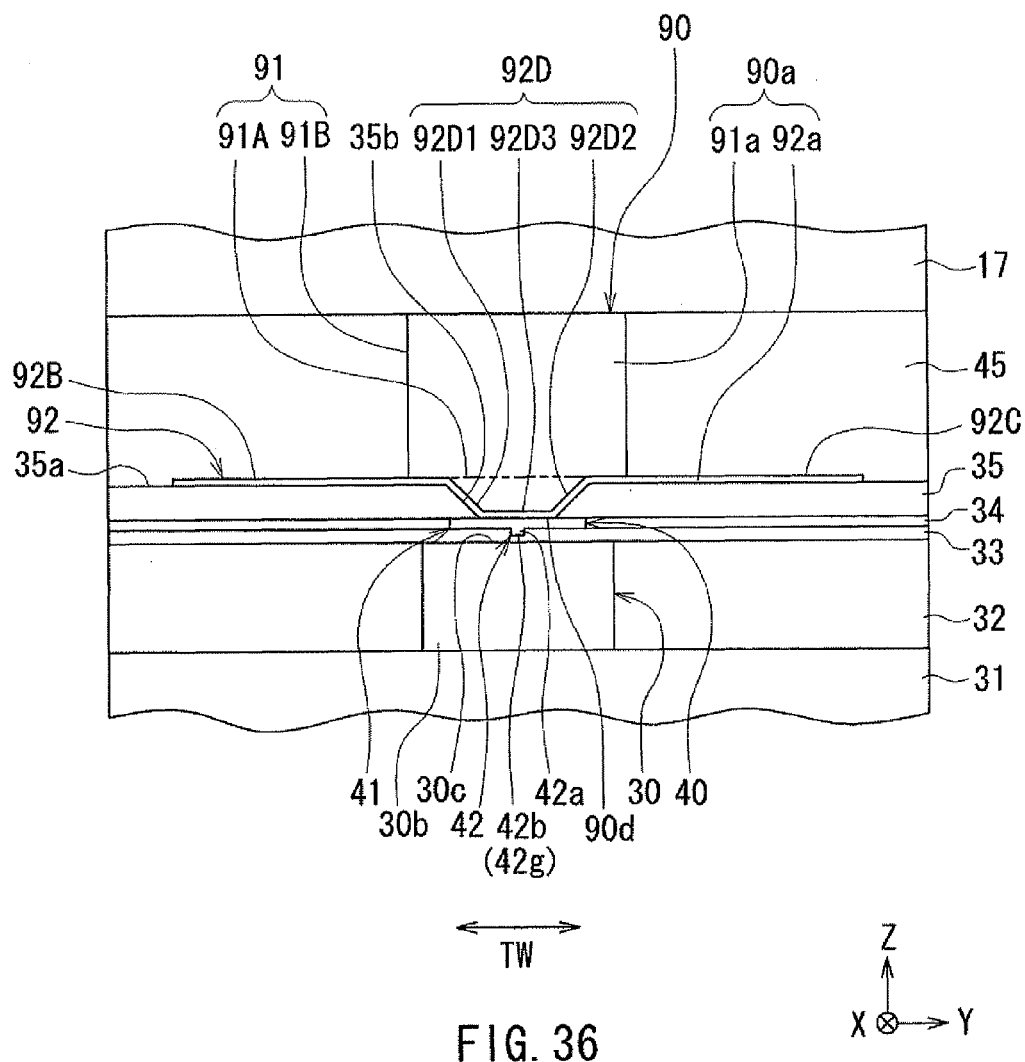
FIG. 36 is a front view showing the main part of a thermally-assisted magnetic recording head according to a third embodiment of the invention.

A third embodiment of the present invention will now be described. First, reference is made to FIG. 36 to describe the differences of the thermally-assisted magnetic recording head 1 according to the third embodiment from that according to the second embodiment. FIG. 36 is a front view showing the main part of the thermally-assisted magnetic recording head 1. FIG. 36 shows part of the medium facing surface 12a. The thermally-assisted magnetic recording head 1 according to the present embodiment has the plasmon generator 40 of the first embodiment, instead of the plasmon generator 80 of the second embodiment. The groove 33b of the cladding layer 33 of the present embodiment has the same shape as in the first embodiment. As in the first embodiment, the thermally-assisted magnetic recording head 1 according to the present embodiment has the dielectric layer 34.

The thermally-assisted magnetic recording head 1 further has a dielectric layer 35 disposed over the plasmon generator 40 and the dielectric layer 34. The dielectric layer 35 has a top surface 35a, and a groove 35b that opens in the top surface 35a and is located above the core 30. The groove 35b extends in the direction perpendicular to the medium facing surface 12a (the X direction). The cross section of the groove 35b parallel to the medium facing surface 12a is in the shape of a trapezoid in which the lower base or the side closer to the evanescent light generating surface 30c of the core 30 is shorter than the opposite side or the upper base. The bottom of the groove 35b is flush with the top surface of the plasmon generator 40 (the top surface of the base part 41). The dielectric layer 35 is made of $SiO_2$, for example.

The magnetic pole 90 of the present embodiment has a bottom end portion 90d, which is planar, in place of the edge part 90b. The second layer 92 of the magnetic pole 90 has the extended portions 92B and 92C, and further has a protruding portion 92D in place of the V-shaped portion 92A. The protruding portion 92D protrudes from the extended portions 92B and 92C toward the core 30. The protruding portion 92D includes part of the end face 92a of the second layer 92 and the bottom end portion 90d. The groove 35b mentioned above is provided to accommodate the protruding portion 92D.

The protruding portion 92D has a bottom portion 92D3 that is located closer to the evanescent light generating surface 30c of the core 30, and a first sidewall portion 92D1 and a second sidewall portion 92D2 that are connected to opposite ends of the bottom portion 92D3 in the track width direction TW and that increase in distance from each other with increasing distance from the bottom portion 92D3. The first and second sidewall portions 92D1 and 92D2 and the bottom portion 92D3 are each shaped like a plate. The first and second sidewall portions 92D1 and 92D2 are arranged along the wall faces of the groove 35b. The bottom portion 92D3 is in contact with the base part 41 of the plasmon generator 40. The bottom end portion 90d is formed of the bottom surface of the bottom portion 92D3.

The extended portion 92B is connected to an end of the first sidewall portion 92D1 opposite from the bottom portion 92D3. The extended portion 92C is connected to an end of the second sidewall portion 92D2 opposite from the bottom portion 92D3.

The first layer 91 of the magnetic pole 90 of the present embodiment has a first portion 91A and a second portion 91B as in the second embodiment. The first portion 91A of the present embodiment is accommodated in the space defined by the protruding portion 92D (the first and second sidewall portions 92D1 and 92D2 and the bottom portion 92D3) of the second layer 92. The cross section of the first portion 91A parallel to the medium facing surface 12a is in the shape of a trapezoid in which the lower base or the side closer to the evanescent light generating surface 30c of the core 30 is shorter than the opposite side or the upper base. The first portion 91A is sandwiched between the first and second sidewall portions 92D1 and 92D2 of the protruding portion 92D of the second layer 92 and is in contact with the first and second sidewall portions 92D1 and 92D2 and the bottom portion 92D3.

The shape and location of the second portion 91B of the present embodiment are the same as those of the second portion 91B of the second embodiment shown in FIG. 26, FIG. 28, and FIG. 29.

Figure 37:
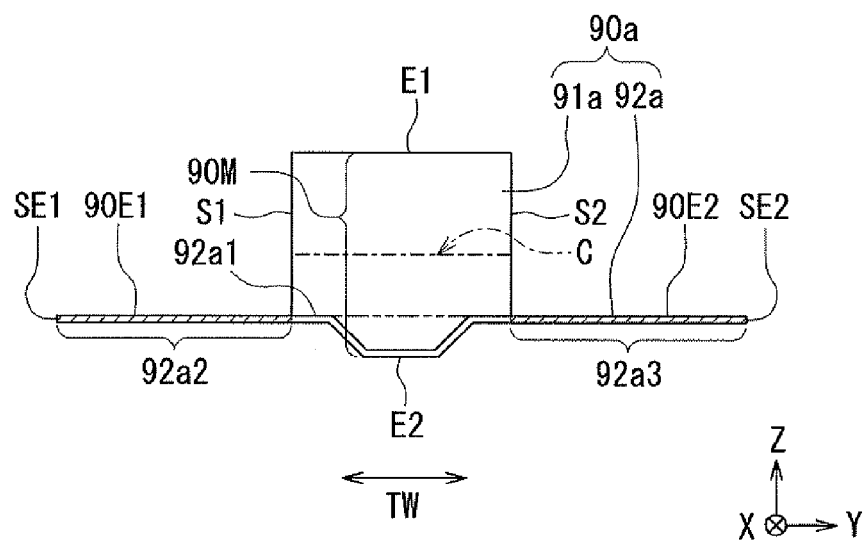
FIG. 37 is a front view showing the front end face of the magnetic pole of the third embodiment of the invention.

Reference is now made to FIG. 37 to describe the front end face 90a of the magnetic pole 90 of the present embodiment. FIG. 37 is a front view showing the front end face 90a of the magnetic pole 90. The front end face 90a of the magnetic pole 90 of the present embodiment has basically the same configuration as that of the front end face 90a of the magnetic pole 90 of the second embodiment shown in FIG. 27. In the present embodiment, however, the second end portion E2 of the main portion 90M is not a point but a straight line having a length. The second end portion E2 lies at an end of the bottom end portion 90d of the magnetic pole 90. The first portion 92a1 of the end face 92a of the second layer 92 of the present embodiment is composed of the end face of the protruding portion 92D located in the medium facing surface 12a and part of the end face of each of the extended portions 92B and 92C located in the medium facing surface 12a.

The step of forming the magnetic pole 90 of the present embodiment will now be described with reference to FIG. 38 to FIG. 41. FIG. 38 to FIG. 41 are cross-sectional views each showing part of a stack of layers formed in the process of manufacturing the thermally-assisted magnetic recording head 1. FIG. 38 to FIG. 41 each show a cross section taken in the position where the medium facing surface 12a is to be formed.

Figure 38:
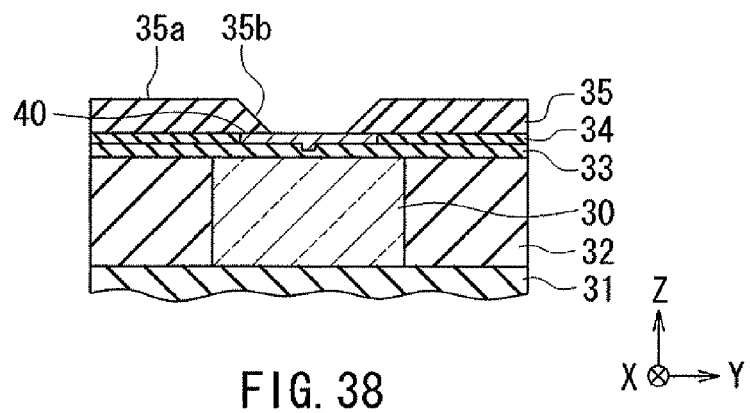
FIG. 38 is a cross-sectional view showing a step of a method of manufacturing the thermally-assisted magnetic recording head according to the third embodiment of the invention.

The plasmon generator 40 of the present embodiment is formed by the same method as in the first embodiment. FIG. 38 shows a step that follows the formation of the plasmon generator 40. In this step, first, the dielectric layer 35 is formed over the entire top surface of the stack. Then, an etching mask is formed on the dielectric layer 35. The etching mask has an opening shaped to correspond to the planar shape of the protruding portion 92D of the magnetic pole 90 to be formed later. The dielectric layer 35 is then taper-etched by, for example, reactive ion etching using the etching mask to thereby form the groove 35b in the dielectric layer 35. The etching mask is then removed.

Figure 39:
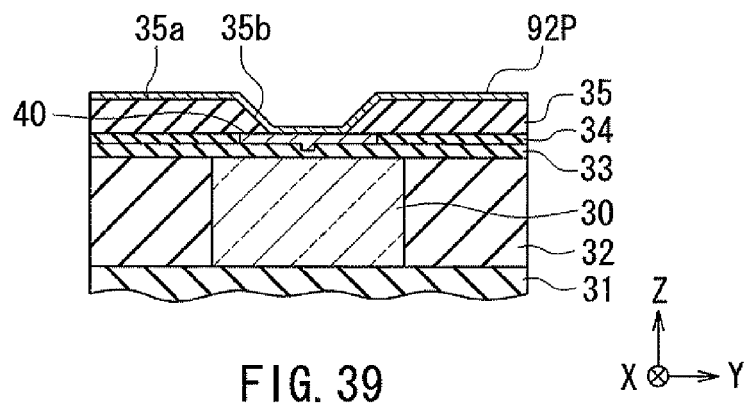
FIG. 39 is a cross-sectional view showing a step that follows the step shown in FIG. 38.
Figure 40:
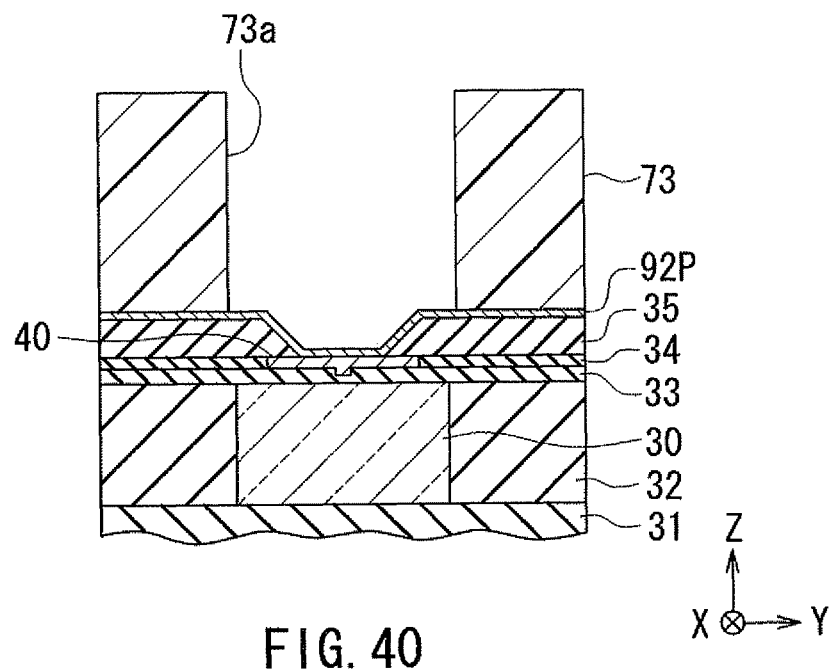
FIG. 40 is a cross-sectional view showing a step that follows the step shown in FIG. 39.

Next, as shown in FIG. 39, the seed layer 92P is formed over the entire top surface of the stack. The frame 73 is then formed on the seed layer 92P as shown in FIG. 40.

Figure 41:
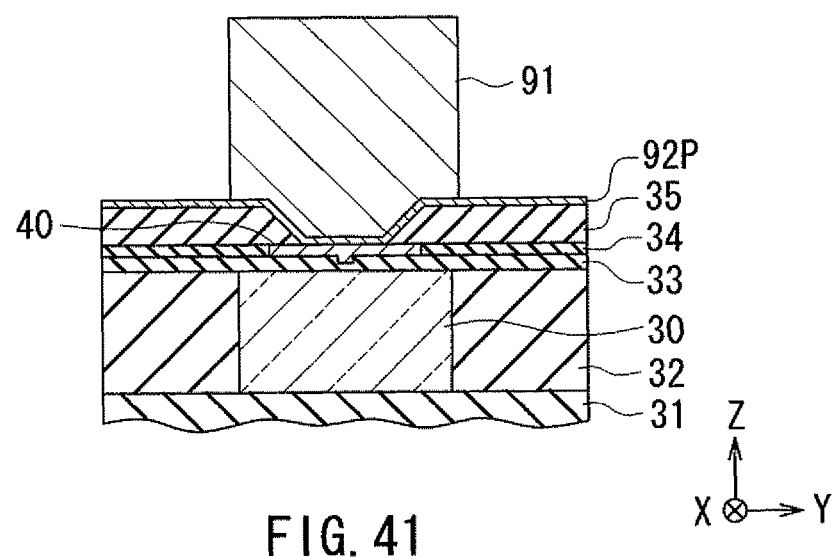
FIG. 41 is a cross-sectional view showing a step that follows the step shown in FIG. 40.

FIG. 41 shows the next step. In this step, first, a plating layer made of a magnetic material, that is, the first layer 91 of the magnetic pole 90, is formed in the opening 73a of the frame 73 by frame plating using the seed layer 92P as an electrode and a seed. The frame 73 is then removed. The subsequent steps are the same as in the second embodiment.

The remainder of configuration, function and effects of the present embodiment are similar to those of the first or second embodiment.

The present invention is not limited to the foregoing embodiments, and various modifications may be made thereto. For example, as far as the requirements of the appended claims are met, the shapes and the arrangement of the first layer and the second layer of the magnetic pole, and the shapes and the arrangement of the main portion and the first and second extended portions of the front end face of the magnetic pole may be arbitrarily chosen without being limited to the example illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
    a medium facing surface that faces a magnetic recording medium having a track;
    a magnetic pole that has a front end face located in the medium facing surface and produces a write magnetic field for writing data on the magnetic recording medium, the magnetic pole being made of a soft magnetic material; and
    a heating element that applies heat to the magnetic recording medium,
wherein:
    the magnetic pole forms on the track a distribution of write magnetic field strength that peaks at a first position on the track;
    the heating element forms on the track a distribution of temperature that peaks at a second position on the track;
    the magnetic pole and the heating element are disposed so that the first position is located on a trailing side relative to the second position, the trailing side being a front side in a direction of travel of the magnetic recording medium relative to the thermally-assisted magnetic recording head, and so that the distribution of write magnetic field strength and the distribution of temperature partially overlap each other;
    the front end face of the magnetic pole has a main portion, a first extended portion, and a second extended portion;
    the main portion has: a first end portion that is located on the trailing side and has a length in a track width direction; a second end portion that is located on a leading side, the leading side being a rear side in the direction of travel of the magnetic recording medium relative to the thermally-assisted magnetic recording head; and a first side portion and a second side portion that are opposite to each other in the track width direction;
    the first extended portion is extended in the track width direction from a part of the first side portion, the part of the first side portion being located on the leading side relative to a center of the main portion in the direction of travel of the magnetic recording medium;
    the second extended portion is extended in the track width direction from a part of the second side portion, the part of the second side portion being located on the leading side relative to the center of the main portion in the direction of travel of the magnetic recording medium;
    the first extended portion has a first side end that is farthest from the first side portion;
    the second extended portion has a second side end that is farthest from the second side portion; and
    a distance between the first side end and the second side end in the track width direction is in the range of 2.3 to 20 times the length of the first end portion.

2. The thermally-assisted magnetic recording head according to claim 1, wherein the first position is located on the trailing side relative to the second end portion.

3. The thermally-assisted magnetic recording head according to claim 1, wherein the heating element is an element that generates near-field light.

4. The thermally-assisted magnetic recording head according to claim 1, wherein an end of the first extended portion on the leading side and an end of the second extended portion on the leading side are in line with the second end portion of the main portion.

5. The thermally-assisted magnetic recording head according to claim 1, wherein the first extended portion and the second extended portion are located on the trailing side relative to the second end portion of the main portion.

6. The thermally-assisted magnetic recording head according to claim 1, wherein each of the first and second extended portions has a dimension of 30 to 250 nm in the direction of travel of the magnetic recording medium.

7. A head gimbal assembly comprising the thermally-assisted magnetic recording head according to claim 1, and a suspension that supports the thermally-assisted magnetic recording head.

8. A magnetic recording device comprising:
    a magnetic recording medium;
    the thermally-assisted magnetic recording head according to claim 1; and a positioning device that supports the thermally-assisted magnetic recording head and positions the thermally-assisted magnetic recording head with respect to the magnetic recording medium.

* * * * *